(12) United States Patent
Hayashi

(10) Patent No.: US 7,710,464 B2
(45) Date of Patent: May 4, 2010

(54) IMAGE PHOTOGRAPHING AND RECORDING DEVICE AND METHOD

(75) Inventor: Kenkichi Hayashi, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 655 days.

(21) Appl. No.: 11/283,910

(22) Filed: Nov. 22, 2005

(65) Prior Publication Data

US 2006/0109353 A1 May 25, 2006

(30) Foreign Application Priority Data

Nov. 25, 2004 (JP) .............................. 2004-340655

(51) Int. Cl.
  *H04N 5/225* (2006.01)
  *H04N 5/228* (2006.01)
  *H04N 5/91* (2006.01)
(52) U.S. Cl. ..................... 348/220.1; 348/222.1; 386/69
(58) Field of Classification Search .............. 348/218.1, 348/207.2, 256, 242, 14.14, 220.1, 230.1, 348/231.99, 14.5, 222.1; 386/369, 73, 96
See application file for complete search history.

(56) References Cited

U.S. PATENT DOCUMENTS

| 6,002,429 | A  | * | 12/1999 | Ochi et al. ................ 348/220.1 |
| 6,771,308 | B1 | * | 8/2004  | Yamamoto et al. ........ 348/207.2 |
| 7,242,850 | B2 | * | 7/2007  | Cok ............................. 386/73 |
| 2003/0107657 | A1 | * | 6/2003 | Shioji et al. ............... 348/220.1 |
| 2003/0113099 | A1 | * | 6/2003 | Kaku .......................... 386/69 |
| 2004/0218059 | A1 | * | 11/2004 | Obrador et al. .......... 348/220.1 |

FOREIGN PATENT DOCUMENTS

| JP | A 9-83873    | 3/1997  |
| JP | 2000-299813  | 10/2000 |
| JP | 2002-262234  | 9/2002  |
| JP | 2004-064383  | 2/2004  |
| JP | A 2004-172978| 6/2004  |
| JP | 2006-094058  | 4/2006  |

\* cited by examiner

*Primary Examiner*—David L Ometz
*Assistant Examiner*—Ahmed A Berhan
(74) *Attorney, Agent, or Firm*—Chad M. Herring; Sheldon J. Moss

(57) ABSTRACT

An image photographing and recording device and method. In the device and method, a scene is repeatedly photographed at a predetermined frame rate as a static image of a predetermined resolution. Static image data outputted by photographing is successively recorded on a recording medium, the static image data being in non-compressed or compressed by a compression method which does not utilize correlation between frames. A static image or a dynamic image as an object of output is designated. When a static image is designated, static image data corresponding to the static image is read-out from the recording medium. When a dynamic image is designated, a static image data group corresponding to the dynamic image is read-out, and image processing for a dynamic image is carried out thereon, and data obtained by the image processing for a dynamic image is outputted as dynamic image data.

15 Claims, 17 Drawing Sheets

F I G. 16
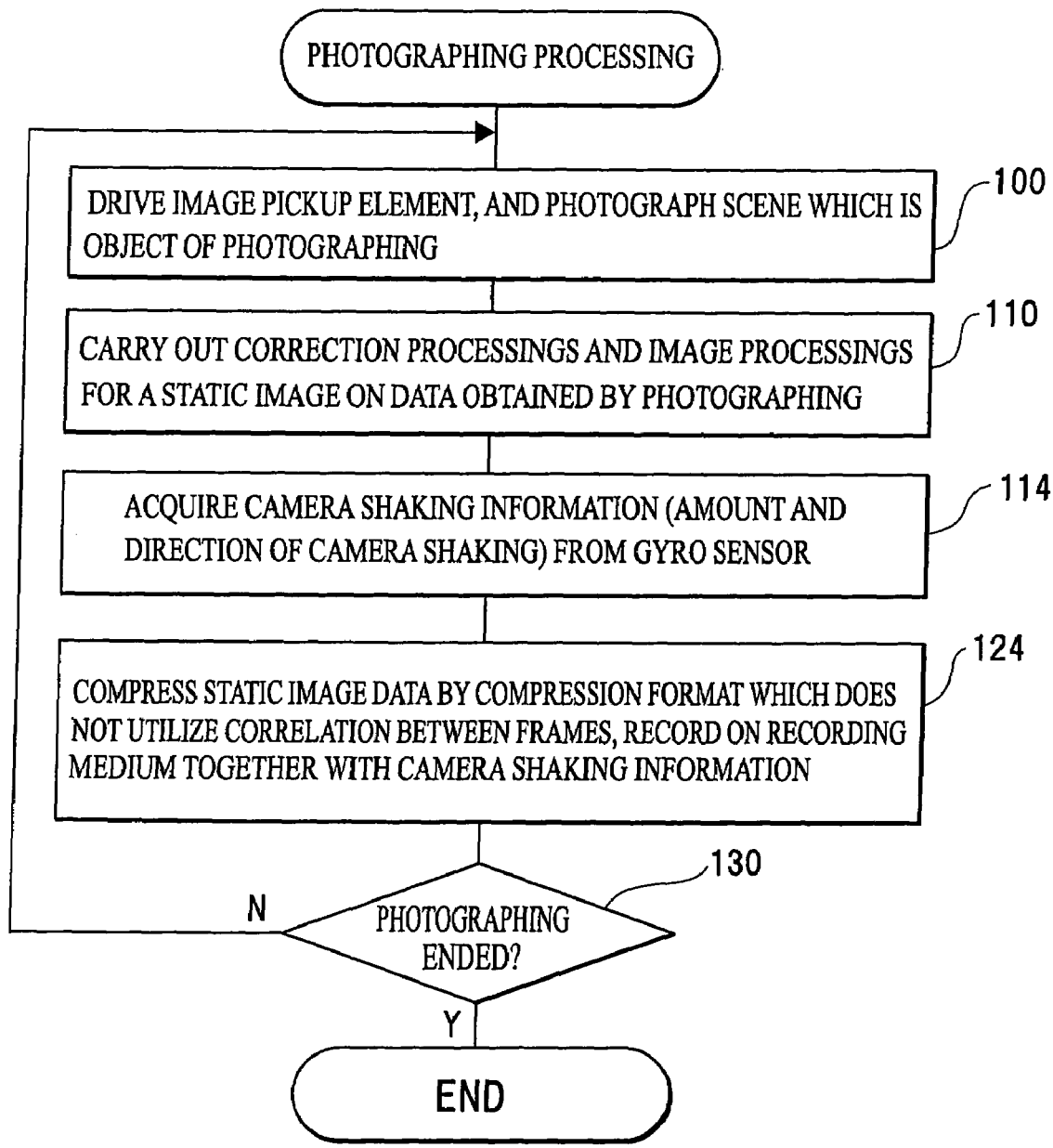

IMAGE PHOTOGRAPHING AND RECORDING DEVICE AND METHOD

CROSS-REFERENCE TO RELATED APPLICATION

This application claims priority under 35 USC 119 from Japanese Patent Application No. 2004-340655, the disclosure of which is incorporated by reference herein.

BACKGROUND OF THE INVENTION

1. Field of the Invention

The present invention relates to an image photographing and recording device and method, and in particular, to an image photographing and recording device which can photograph and record images, and to an image photographing and recording method which can be applied to the image photographing and recording device.

2. Description of the Related Art

Still images have advantages such as they can easily be browsed through and enjoyed when stored as photographic prints, and the like. Dynamic images are applied to the recording of scenes in which there is movement, and the like. Thus, still images and dynamic images have their respectively different characteristics. Therefore, in recent years, it has become common to provide a function for photographing and recording a subject of photographing as a dynamic image at a digital still camera (DSC), which is originally for photographing and recording a subject of photographing as a still mage (see, for example, Japanese Patent Application Laid-Open (JP-A) No. 9-83873). Further, it has also become common to add to a digital video camera, which is originally for photographing and recording a subject of photographing as a dynamic image, a function for photographing and recording a subject of photographing as a still image. Photographing and recording devices, which are provided with both a function for photographing and recording still images and a function for photographing and recording dynamic images, are coming into general use.

Further, in relation to the aforementioned, JP-A No. 2004-172978 discloses an image pickup device of a structure in which a CCD, an image pickup lens, and a shutter which are for dynamic image photographing, and a CCD, an image pickup lens, and a shutter which are for static image photographing, are respectively provided. When a release operation is carried out at the time of dynamic image display or at the time of recording, a static image is photographed by the CCD for static image photographing, and is recorded on a memory card.

As disclosed above photographing and recording devices having a function for photographing and recording static images and a function for photographing and recording dynamic images as described above, structured so as to be able to selectively photograph and record either one of a static image or a dynamic image, are common, as in JP-A No. 9-83873 for example. However, because static images and dynamic images have their respectively different characteristics as described above, there is the need to record the same scene as both a static image and a dynamic image. However, even in a photographing and recording device which is equipped with a function which photographs and records static images and a function which photographs and records dynamic images, the photographing operations in a case in which, for example, a static image is to be photographed and recorded at a desired timings while also photographing and recording a subject of photographing as a dynamic image, are extremely difficult. In order to overcome this, considered has been to, at the time of photographing a subject of photographing, record the results of photographing as dynamic image data, and cut-out the static image data from the dynamic image data after photographing.

However, for static images, the standard demanded for image quality is relatively high, whereas the number of pixels of one frame of dynamic image data, which is photographed and recorded by this type of photographing and recording device, is generally about VGA size (640×480 pixels). Even if static image data is cut-out from dynamic image data which has been photographed and recorded, highly-detailed static image data cannot be obtained. Further, image photographing and recording devices, which can record highly-detailed dynamic images corresponding to high definition television (HDTV) size (e.g., 1280×720 pixels, or more), also have started to appear on the market. In this type of photographing and recording device, a format which compresses by using frame correlation, such as MPEG or the like for example, is employed as the recording format for recording the dynamic image data onto a recording medium. When an attempt is made to cut-out static image data from such dynamic image data, there is the need for the image regenerating processing to regenerate or the like the cut-out object static image from both difference data and reference static image data which is included in the dynamic image data. A great burden is made on the device, and further, the image quality of the static image data which is cut-out is insufficient.

Moreover, in photographing and recording static image data, in order to obtain high-quality static image data which is good for enjoyment, generally, image processing, such as contour enhancement processing and the like, for the purposes of improving the image quality is carried out on the image signal outputted from the image pickup element, and thereafter, the image signal is recorded on the recording medium as static image data. In contrast, in photographing and recording a dynamic image, in order to obtain a dynamic image which does not cause a strange feeling when viewed, generally, image processing such as smoothing, which makes the differences between frames smaller, and removal of the high frequency components, and the like is carried out on the image signal outputted from the image pickup element, and thereafter, the image signal is recorded on the recording medium as dynamic image data. In this way, the suitable types of image processing for static images and dynamic images are different, and images processing, such as smoothing or the like which is carried out on dynamic image data, is a cause of deterioration in the image quality of static image data which is cut-out from the dynamic image data. Accordingly, the image signal outputted from the image pickup element at the time of photographing is recorded on the recording medium as dynamic image data, and even if an attempt is made to cut static image data out from the dynamic image data after photographing, there is the problem that static image data which is highly-detailed and is of satisfactory image quality cannot be obtained.

Further, in the technique disclosed in JP-A No. 2004-172978, a CCD, an image pickup lens, and a shutter are provided respectively for dynamic image photographing and for static image photographing. Although the photographing and recording of a static image can be carried out in parallel with the photographing and recording of a dynamic image, the problem arises that the structure of the device is complex and costs increase.

SUMMARY OF THE INVENTION

The present invention was developed in consideration of the aforementioned, and an object thereof is to provide an image photographing and recording device and an image photographing and recording method which can output a photographed scene with satisfactory image quality as a static image or as a dynamic image.

A first aspect of the present invention provides an image photographing and recording device comprising: a photographing section repeatedly photographing a scene which is an object of photographing, at a predetermined frame rate as a static image of a predetermined resolution; a recording section successively recording static image data, which is successively outputted by photographing by the photographing section, on a recording medium with the static image data in a non-compressed state or a state of being compressed by a compression method which does not utilize correlation between frames; a designating section for designating a static image or a dynamic image which is an object of output; a static image outputting section which, when a static image as the object of output is designated via the designating section, reads-out, from the recording medium, static image data corresponding to the static image which is the object of output, and outputs the static image data; and a dynamic image outputting section which, when a dynamic image as the object of output is designated via the designating section, reads-out, from the recording medium, a static image data group corresponding to the dynamic image which is the object of output, and carries out image processing for a dynamic image on the static image data group which is read-out, and outputs data obtained by the image processing for a dynamic image as dynamic image data.

A second aspect of the present invention provides an image photographing and recording method comprising repeatedly photographing a scene which is an object of photographing, by a photographing section at a predetermined frame rate as a static image of a predetermined resolution; successively recording static image data, which is successively outputted by photographing by the photographing section, on a recording medium with the static image data in a non-compressed state or a state of being compressed by a compression method which does not utilize correlation between frames; when a static image as an object of output is designated via a designating section for designating a static image or a dynamic image as an object of output, reading-out from the recording medium and outputting static image data corresponding to the static image which is the object of output; and when a dynamic image as the object of output is designated via the designating section, reading-out, from the recording medium, a static image data group corresponding to the dynamic image which is the object of output, and carrying out image processing for a dynamic image on the read-out static image data group, and outputting data obtained by the image processing for a dynamic image as dynamic image data.

Other aspects, features, and advantages of the present invention will become apparent from the following description in conjunction with the appended drawings.

BRIEF DESCRIPTION OF THE DRAWINGS

Preferred embodiments of the present invention will be described in detail based on the following figures, in which:

FIG. 16 is a flowchart showing contents of photographing processing relating to the sixth embodiment.

DETAILED DESCRIPTION OF THE INVENTION

Examples of embodiments of the present invention will be described in detail hereinafter with reference to the drawings.

First Embodiment

Figure 1:
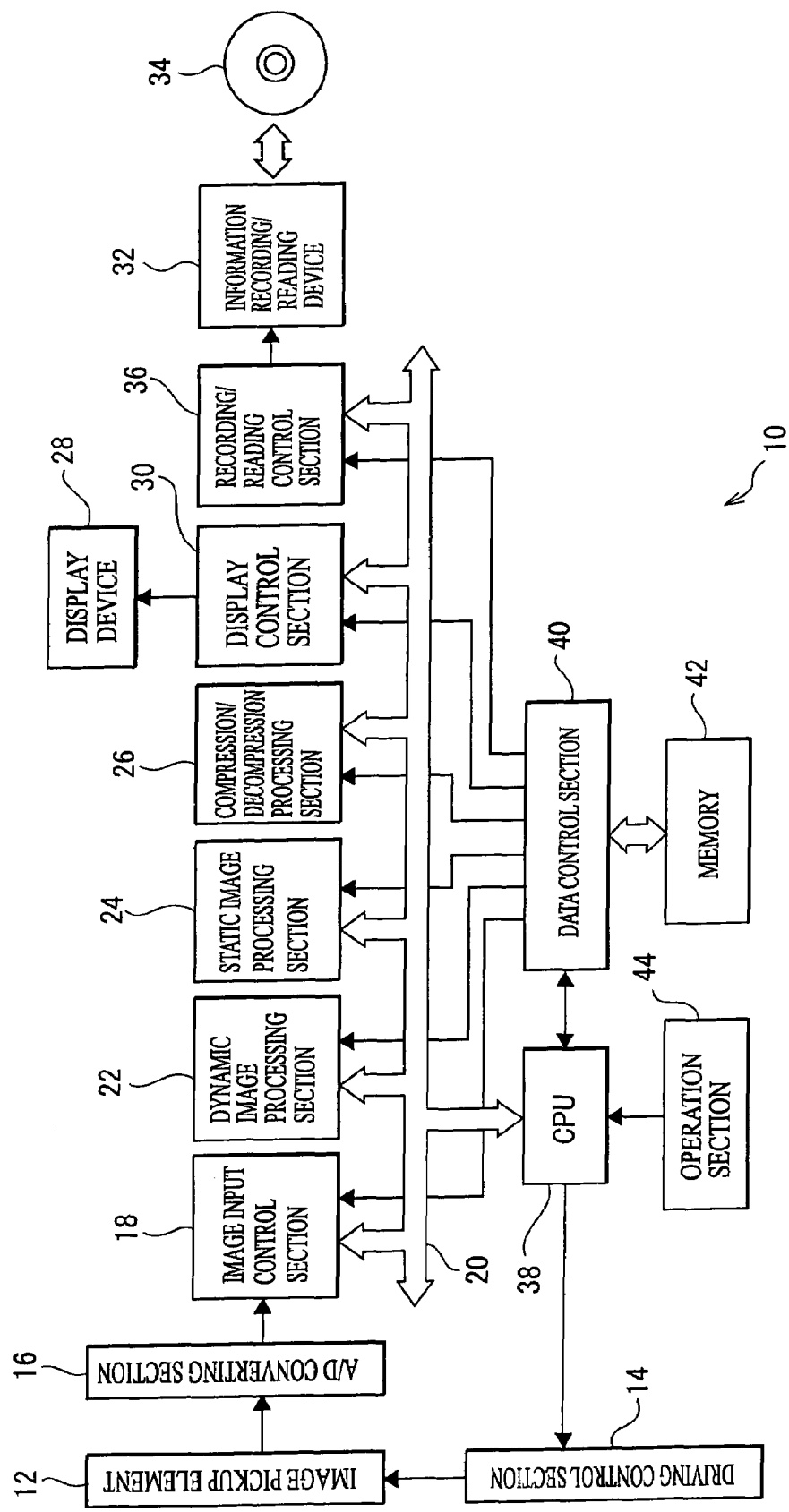
FIG. 1 is a block diagram showing the schematic structure of an image photographing and recording device relating to a first embodiment.

A photographing and recording device 10, which can output a photographed scene as a static image and as a dynamic image, is shown in FIG. 1. The photographing and recording device 10 has an image pickup element 12 formed from an area CCD sensor or the like. The image pickup element 12 is disposed at the focal point position of a lens (not shown). Light, which is reflected by a subject of photographing and which is incident on the lens, is imaged on the light-receiving surface of the image pickup element 12. A driving control section 14 is connected to the image pickup element 12, and the driving control section 14 is connected to a CPU 38. At the time of photographing a scene which is the object of photographing, the CPU 38 instructs, to the driving control section 14, a frame rate for image pickup by the image pickup element 12. The driving control section 14 generates a timing signal for causing image pickup by the image pickup element 12 to be carried out at the frame rate instructed by the CPU 38, and outputs the timing signal to the image pickup element 12. The image pickup element 12 is driven at a timing which is synchronous with the timing signal inputted from the driving control section 14, and repeatedly outputs an image pickup signal (a signal showing the amount of light received at each of a large number of photoelectric converting cells which are arranged in the form of a matrix on the light-receiving surface) at a period corresponding to the frame rate instructed by the CPU 38. Note that, in the present embodiment, a high-speed image pickup element, in which a large number of photoelectric converting cells corresponding to the resolution are provided and which can pickup the scene which is the object of photographing in great detail at a high resolution corresponding to HDTV (e.g., 1280×720 pixels, or 1920×1080 pixels, or the like) and at a high frame rate (e.g., 30 frame/sec or higher), is used as the image pickup element 12.

An A/D converting section 16 and an image input control section 18 are connected in that order to the signal output end of the image pickup element 12. The image signal outputted from the image pickup element 12 is, by the A/D converting section 16, amplified and converted into digital image pickup data, and inputted to the image input control section 18. The image input control section 18 is connected to a data bus 20, and the inputted image pickup data is sent out to the data bus 20. Connected to the data bus 20 are: a dynamic image processing section 22 carrying out image processing for a dynamic image on image data; a static image processing section 24 carrying out image processing for a static image on image data (image pickup data); a compression/decompression processing section 26 carrying out compression and decompression of image data; a display control section 30 to which is connected a display device 28 which is formed by an LCD or the like and is provided at the main body of the photographing and recording device 10, the display control section 30 controlling display of static images and dynamic images on the display device 28; a recording/reading control section 36 to which an information recording/reading device 32 is connected, and which controls the recording and reading of information with respect to a recording medium (e.g., a removable medium) 34 by the information recording/reading device 32; and the CPU 38. Note that a separate, arbitrary display device may be connected as the display device 28.

The image input control section 18, the dynamic image processing section 22, the static image processing section 24, the compression/decompression processing section 26, the display control section 30, the recording/reading control section 36, and the CPU 38, which are connected to the data bus 20, are respectively connected to a data control section 40. The transfer of data via the data bus 20 and among these control sections and processing sections is controlled by the data control section 40. A memory 42 is connected to the data control section 40. Further, although not shown, the image input control section 18, the dynamic image processing section 22, the static image processing section 24, the compression/decompression processing section 26, the display control section 30, and the recording/reading control section 36 are connected to the CPU 38 as well, and the processings at these control sections and processing sections are controlled by the CPU 38. An operation section 44 is connected to the CPU 38. The operation section 44 is structured so as to include a power source switch provided at the main body of the photographing and recording device 10, various types of setting switches, a photographing instructing switch whose contact switches in accordance with operation of an unillustrated photographing instructing button, and the like (none of these switches are illustrated).

Note that the operation section 44 corresponds to the designating section relating to the present invention. The portions of the image pickup element 12, the A/D converting section 16, the image input control section 18, and the static image processing section 24, the portions of which that carry out various types of correction processing which will be described later, correspond to the photographing section relating to the present invention. Further, the portions of the static image processing section 24 that carry out image processing for a static image which will be described later, as well as the recording/reading control section 36, the information recording/reading device 32, and the display control section 30, correspond to the static image outputting section relating to the present invention. The dynamic image processing section 22, as well as the recording/reading control section 36, the information recording/reading device 32, and the display control section 30, correspond to the dynamic image outputting section relating to the present invention.

Further, although not illustrated, a microphone and speakers also are provided at the photographing and recording device 10. The microphone is connected to the data bus 20 via an A/D converter or the like, and the speakers are connected to the data bus 20 via an amplifier and a D/A converter.

Figure 2:
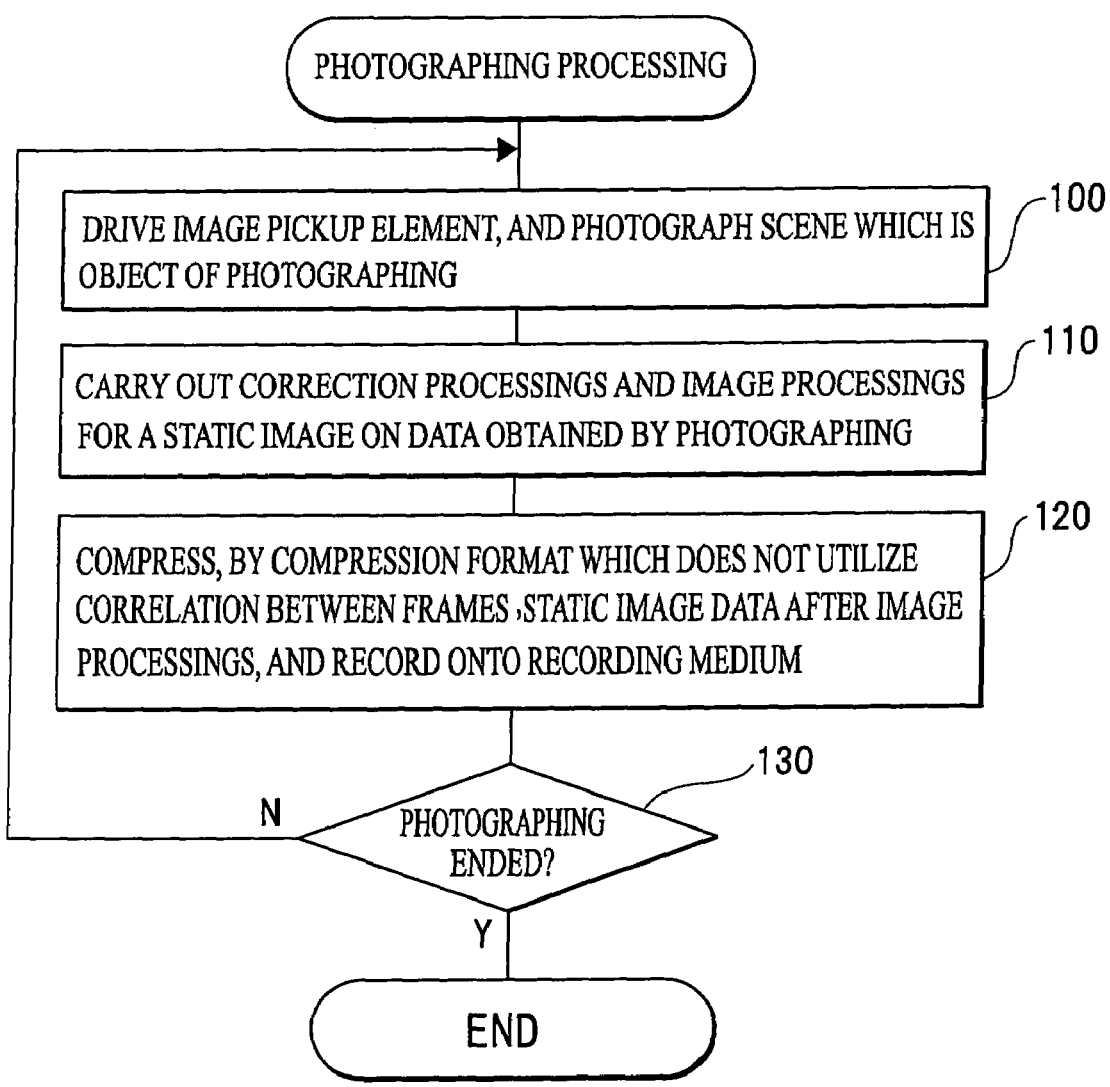
FIG. 2 is a flowchart showing contents of photographing processing relating to the first embodiment.

Next, as operation of the present first embodiment, description will be given, with reference to the flowchart of FIG. 2, of photographing processing executed at the CPU 38 due to a signal, which expresses that photographing has been instructed, being inputted from the operation section 44 accompanying the operation of the photographing instructing button by the user. In step 100, at the CPU 38, the frame rate in the image pickup by the image pickup element 12 is instructed to the driving control section 14, and image pickup of the scene which is the object of photographing by the image pickup element 12 is started. In this way, due to the driving control section 14 generating a timing signal corresponding to the frame rate instructed by the CPU 38 and outputting the timing signal to the image pickup element 12, the image pickup element 12 is driven. The image pickup element 12 successively outputs, at a period corresponding to the frame rate instructed by the CPU 38, image pickup signals corresponding to the results of photographing the scene which is the object of photographing. The image pickup signals which are successively outputted from the image pickup element 12 are converted into digital image pickup data by the A/D converting section 16, and are successively inputted to the image input control section 18.

In subsequent step 110, the CPU 38, via the data control section 40, instructs the image input control section 18 to transfer the successively inputted image pickup data to the static image processing section 24, and instructs the static image processing section 24 to execute various types of correction processing and image processing for a static image. In this way, the image pickup data, which is successively inputted to the image input control section 18, is successively transferred to the static image processing section 24 via the data bus 20. The static image processing section 24 first carries out various types of correction processing on the image pickup data successively transferred from the image input control section 18. This correction processing includes darkness correction for correcting the dark output of the image pickup element 12, gain correction, γ correction, and white balance correction for correcting the dispersion in the photoelectric converting characteristics of the respective photoelectric converting cells of the image pickup element 12, aberration correction for correcting distortion of the image due to aberration of the lens, pixel interpolation (processing for determining, by interpolation, data expressing the amounts of received light (densities) of R, G, B at the same pixel position on the light-receiving surface, from data outputted from the respective photoelectric converting cells of R, G, B corresponding to single pixels which are adjacent thereto on the light-receiving surface of the image pickup element 12), Y/C conversion processing, and the like. Due to this correction processing, static image data, which expresses the scene photographed by the image pickup element 12 by luminance and color difference image data, is obtained from the respective image pickup data which are inputted.

The static image processing section 24 carries out image processing for a static image on the static image data which has been subjected to the various types of correction processing, in order to improve the image quality of the static image which that static image data expresses. Examples of the image processing for a static image include noise reduction processing which reduces the noise components in the static image data, contour enhancement processing which extracts contour portions in the static image and enhances the extracted contour portions, filtering processing for damping or enhancing specific spatial frequency components, color correction processing which corrects the color balance of the static image, and the like. Further, a plurality of photographing modes may be provided in accordance with types of scenes which are objects of photographing, and a switch for selecting a desired photographing mode from among these plurality of photographing modes may be provided at the operation section 44, and parameters in the aforementioned image processing for a static image may be switched in accordance with the photographing mode selected by this switch being operated. Due to the aforementioned correction processing and image processing for a static image being carried out respectively on the image pickup data which is successively inputted to the static image processing section 24, a static image data group of high image quality which is good for enjoyment as respective static images, is obtained from the successively inputted image pickup data.

In next step 120, via the data control section 40, the CPU 38 instructs the static image processing section 24 to successively transfer the static image data, which has been subjected to the correction processing and the image processing for a static image, to the compression/decompression processing section 26. The CPU 38 instructs the compression/decompression processing section 26 to compress the static image data in a predetermined compression format which does not utilize correlation between frames, and via the data control section 40, instructs the compression/decompression processing section 26 to transfer the compressed static image data to the recording/reading control section 36. Further, the CPU 38 instructs the recording/reading control section 36 to record information onto the recording medium 34. In this way, the static image data, which has gone through the correction processing and the image processing for a static image, is successively transferred from the static image processing section 24 via the data bus 20 to the compression/decompression processing section 26, and after being compressed by the compression/decompression processing section 26 in a predetermined compression format (e.g., jpeg or another format) which does not use correlation between frames, is successively transferred as compressed static image data to the recording/reading control section 36 via the data bus 20. The recording/reading control section 36 successively records the successively-transferred compressed static image data onto the recording medium 34 via the information recording/reading device 32.

Note that, in parallel with the generation and recording of the compressed static image data, sound data, which is outputted from the microphone via the A/D converter and the like, also is successively transferred to the recording/reading control section 36 via the data bus 20, and is successively recorded, together with the compressed static image data, onto the recording medium 34 via the information recording/reading device 32.

In step 130, it is judged whether or not a signal, which expresses that the end of photographing is instructed, is inputted from the operation section 44 due to the photographing instructing button being operated by the user. If this judgment is negative, the routine returns to step 100, and steps 100 through 130 are repeated until the judgment of step 100 is affirmative. In this way, during the period of time that photographing is being instructed by the user, the image pickup data, which is outputted from the image pickup element 12 via the A/D converting section 16, is successively recorded on the recording medium 34 as compressed static image data which has undergone the correction processing, the image processing for a static image, and the compression processing. Then, when the end of photographing is instructed by the user, the judgment in step 130 is affirmative, and the photographing processing is ended.

Figure 3:
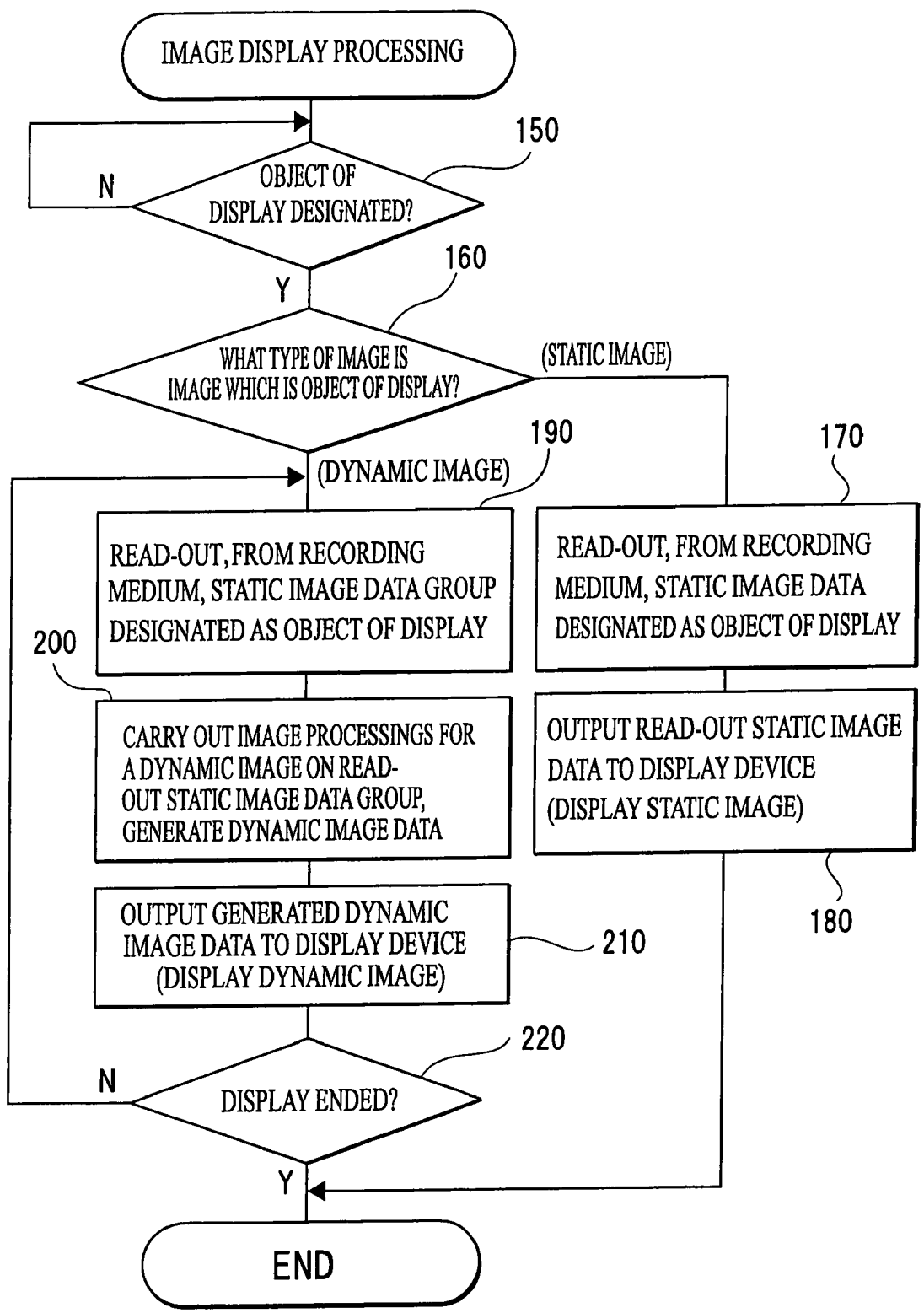
FIG. 3 is a flowchart showing contents of image display processing relating to the first embodiment.

Next, with reference to FIG. 3, description will be given of image display processing which is executed in a case in which, due to the operation section 44 being operated by the user, an instruction is given to display the static image data group recorded on the recording medium 34, as a static image or a dynamic image on the display device 28.

In step 150, it is judged whether or not the image which is the object of display and the form of the display (i.e., whether the image is to be displayed as a static image or is to be displayed as a dynamic image) have been designated by the user, and the judgment of step 150 is repeated until the judgment is affirmative. The designation by the user of the image which is the object of display can be carried out as follows for example: a plurality of thumbnail images of the compressed static image data are generated and displayed as a list in the order of their photographing dates and times on the basis of the compressed static image data recorded on the recording medium, and due to the compressed static image data which are displayed in a list as thumbnail images being switched in accordance with an instruction from the user, all of the thumbnail images of the compressed static image data are made to be displayable (or instead, it is possible to make displayable only the thumbnail images of the compressed static image data whose photographed dates and times are within a given time interval), and the thumbnail image of the compressed static image data which is to be displayed as a static image or a dynamic image is selected by the user (in a case in which the form of display is a dynamic image, for example, the user selects at least the thumbnail image of the compressed static image data corresponding to the beginning of the dynamic image which is the object of display, or the like), and the user selects whether the form of the display is to be a static image or a dynamic image. Further, the image which is the object of display may be designated by other information, such as the photographing date and time or the like, being designated by the user.

When the image which is the object of display and the form of display are indicated by the user, the judgment of step 150 is affirmative, and the routine moves on to step 160 where it is judged whether the designated form of display is a static image or a dynamic image. When the designated form of display is a static image, the CPU 38 instructs the recording/reading control section 36 to read-out, from the recording medium 34, the compressed static image data which is designated as the object of display, and instructs, via the data control section 40, that the compressed static image data which is read-out from the recording medium 34 be transferred to the compression/decompression processing section 26 (step 170). Further, the CPU 38 instructs the compression/decompression processing section 26 to decompress the transferred compressed static image data. In this way, the compressed static image data, which is designated as the object of display, is read-out from the recording medium 34 by the information recording/reading device 32 under the control of the information recording/reading control section 36, and next, is transferred from the information recording/reading control section 36 via the data bus 20 to the compression/decompression processing section 26 and subjected to decompression processing thereat, and the original static image data is thereby regenerated.

Further, in next step 180, the CPU 38, via the data control section 40, instructs the compression/decompression processing section 26 to transfer to the display control section 30 the static image data which has been regenerated by the decompression processing, and instructs the display control section 30 to display the transferred static image data on the display device 28 as a static image. In this way, the static image data, which has been regenerated by the decompression processing, is transferred from the compression/decompression processing section 26 via the data bus 20 to the display control section 30, and is displayed on the display device 28 as a static image. In the present embodiment, because image data which has been subjected to the image processing for a static image (i.e., the compressed static image data) is recorded on the recording medium 34, merely by simply decompressing the compressed static image data and displaying it on the display device 28 as described above, a high-quality static image can be displayed on the display device 28. In a case in which a static image is displayed on the display device 28, the image display processing ends when ending of display is instructed by the user.

On the other hand, in a case in which the designated form of display is a dynamic image, the routine proceeds from step 160 to step 190. The recording/reading control section 36 is instructed to read-out, from the recording medium 34, the compressed static image data group which is designated as the object of display (e.g., a group of a predetermined number of static image data in order of their photographing dates and times, beginning with the designated compressed static image data), and is instructed, via the data control section 40, to successively transfer the compressed static image data group, which was read-out from the recording medium 34, to the compression/decompression processing section 26. Further, the CPU 38 instructs the compression/decompression processing section 26 to decompress the compressed static image data which are successively transferred. In this way, the compressed static image data group, which is designated as the object of display, is successively read-out from the recording medium 34 by the information recording/reading device 32 under the control of the information recording/reading control section 36, and next, is successively transferred from the information recording/reading control section 36 via the data bus 20 to the compression/decompression processing section 26 and subjected to decompression processing thereat, and the original static image data group is thereby regenerated.

In next step 200, the CPU 38 instructs the compression/decompression processing section 26 via the data control section 40 to successively transfer the static image data group, which has been regenerated by the decompression processing, to the dynamic image processing section 22. The CPU 38 instructs the dynamic image processing section 22 to carry out image processing for a dynamic image on the static image data group which is successively transferred. In this way, the static image data, which have been regenerated by the decompression processing, are successively transferred from the compression/decompression processing section 26 via the data bus 20 to the dynamic image processing section 22. Further, the dynamic image processing section 22 carries out image processing for a dynamic image on the static image data group which is successively transferred from the compression/decompression processing section 26. Examples of the image processing for a dynamic image are resolution conversion processing which converts the resolution of the static image data into a resolution corresponding to the number of pixels of the display screen of the display device 28, smoothing processing for reducing the strange feeling when viewed, filtering processing which removes the high frequency components of the spatial frequency, color correction processing for adjusting the color balance, and the like. Due to the aforementioned image processing for a dynamic image being respectively carried out on the static image data group which is successively inputted to the dynamic image processing section 22, a static image data group for dynamic image display (i.e., dynamic image data), which can be displayed as a dynamic image in which there is no strange feeling when viewed, is obtained.

Then, in step 210, the CPU 38 instructs the dynamic image processing section 22 via the data control section 40 to successively transfer to the display control section 30 the static image data group which has undergone the image processing for a dynamic image (i.e., the dynamic image data), and instructs the display control section 30 to display the successively-transferred dynamic image data as a dynamic image on the display device 28. In this way, the dynamic image data, which has undergone the processing for a dynamic image, is successively transferred from the dynamic image processing section 22 via the data bus 20 to the display control section 30, and is displayed on the display device 28 as a dynamic image. In this way, in the present embodiment, because image processing for a dynamic image is carried out on the static image data group which is read-out from the recording medium 34, a dynamic image of satisfactory image quality can be displayed on the display device 28, without spoiling the image quality when displaying a static image on the display device 28. Note that the corresponding sound data also is read-out from the recording medium 34 at the time of displaying the dynamic image, is converted into an analog sound signal at the D/A converter connected to the data bus 20, is amplified by the amplifier, and thereafter, is supplied to the speakers. The sound data is thereby outputted as sound from the speakers.

In next step 220, it is judged whether the end of display of the dynamic image has been instructed, or whether or not the static image data to be displayed as the dynamic image (the compressed static image data) has run out. (Note that, in a case in which the end of the dynamic image which is the object of display is designated by the user, it is also judged whether or the not dynamic image which is being displayed has reached the designated end.) If this judgment is negative, the routine returns to step 190, and steps 190 through 220 are repeated until the judgment in step 220 is affirmative. In this way, until the end of display of the dynamic image is instructed, or the static image data to be displayed as a dynamic image (the compressed static image data) runs out, or the dynamic image being displayed reaches the designated end, the following processing is continued: the compressed static image data is read-out from the recording medium 34 in order of the photographing dates and times, decompression processing and image processing for a dynamic image are carried out on the compressed static image data which is read-out, and the data is displayed as a dynamic image on the display device 28. Then, when the judgment in step 220 is affirmative, the processing ends.

Second Embodiment

A second embodiment of the present invention will be described next. Note that portions which are the same as those of the first embodiment are denoted by the same reference numerals, and description thereof is omitted. Only the portions which are different from the first embodiment will be described.

In a photographing and recording device 46 relating to the present second embodiment (see FIG. 4), the photographing resolution of the image pickup element 12 (i.e., the number of pixels of the image pickup data outputted from the image pickup element) can be switched. The CPU 38 controls the driving control section 14 and the like such that the photographing resolution of the image pickup element 12 is switched, for example, in accordance with a number of pixels designated by the user via the operation section 44. Further, in a case in which the photographing resolution of the image pickup element 12 is relatively high (e.g., in the case of a resolution corresponding to HDTV), the CPU 38 controls the driving control section 14 and the like such that the frame rate during photographing by the image pickup element 12 becomes lower (e.g., 15 frames/sec), in consideration of the possibility that, as the data amount of the image pickup data increases, the data amount (number of pixels) of the static image data increases, and the image processing for a static image at the static image processing section 24, and the like, will not be able to keep pace)

Figure 4:
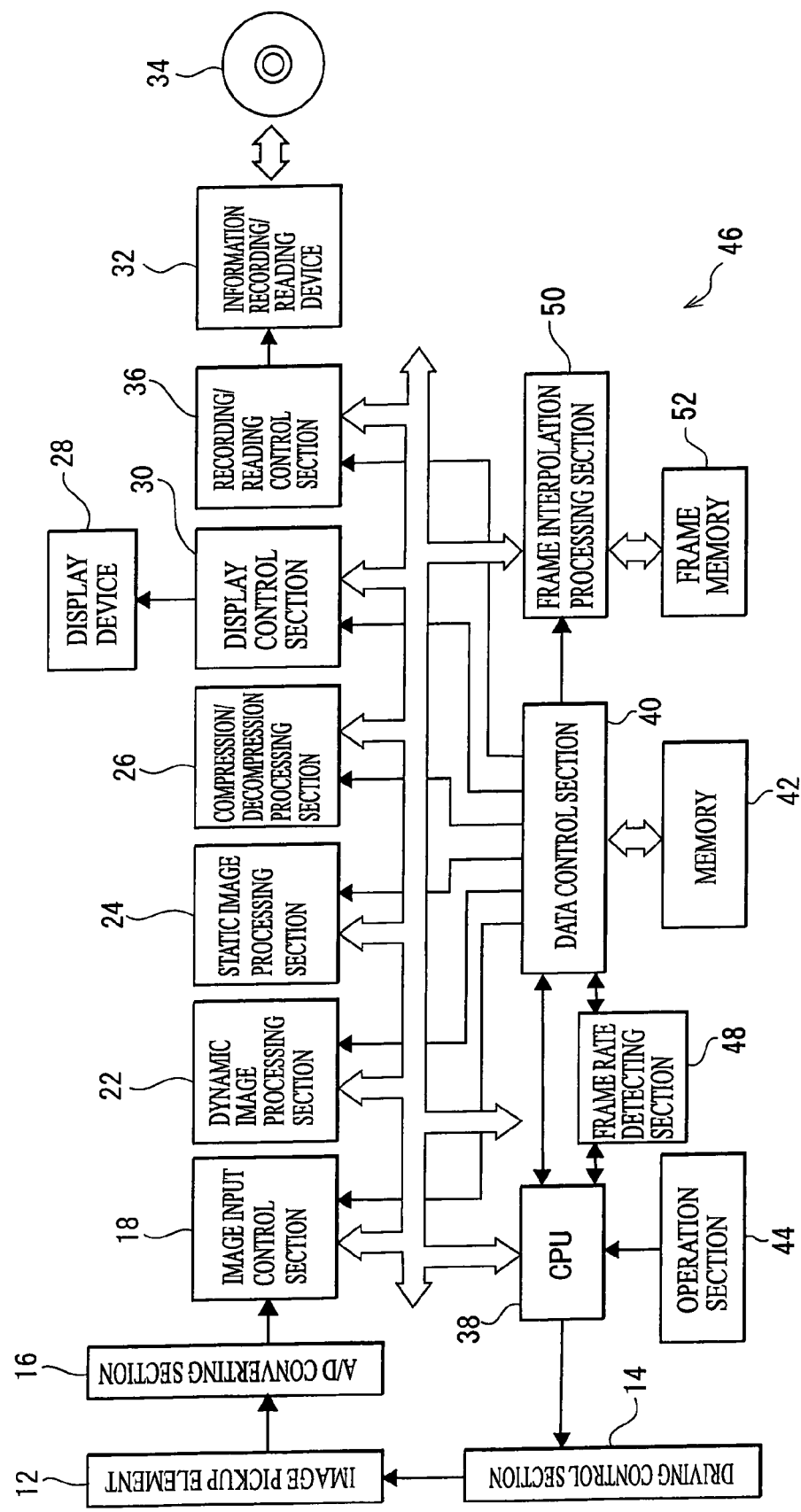
FIG. 4 is a block diagram showing the schematic structure of an image photographing and recording device relating to a second embodiment.

As shown in FIG. 4, a frame rate detecting section 48 which detects a frame rate is provided at the photographing and recording device 46 relating to the second embodiment. The frame rate detecting section 48 is connected to the CPU 38 and the data control section 40. Further, a frame interpolation processing section 50, which carries out frame interpolation processing, is connected to the data bus 20. A frame memory 52, which is used in the frame interpolation processing, is connected to the frame interpolation processing section 50. Moreover, the frame interpolation processing section 50 is connected to the data control section 40, and carries out frame interpolation processing due to an instruction inputted from the frame rate detecting section 48 via the data control section 40.

Figure 5:
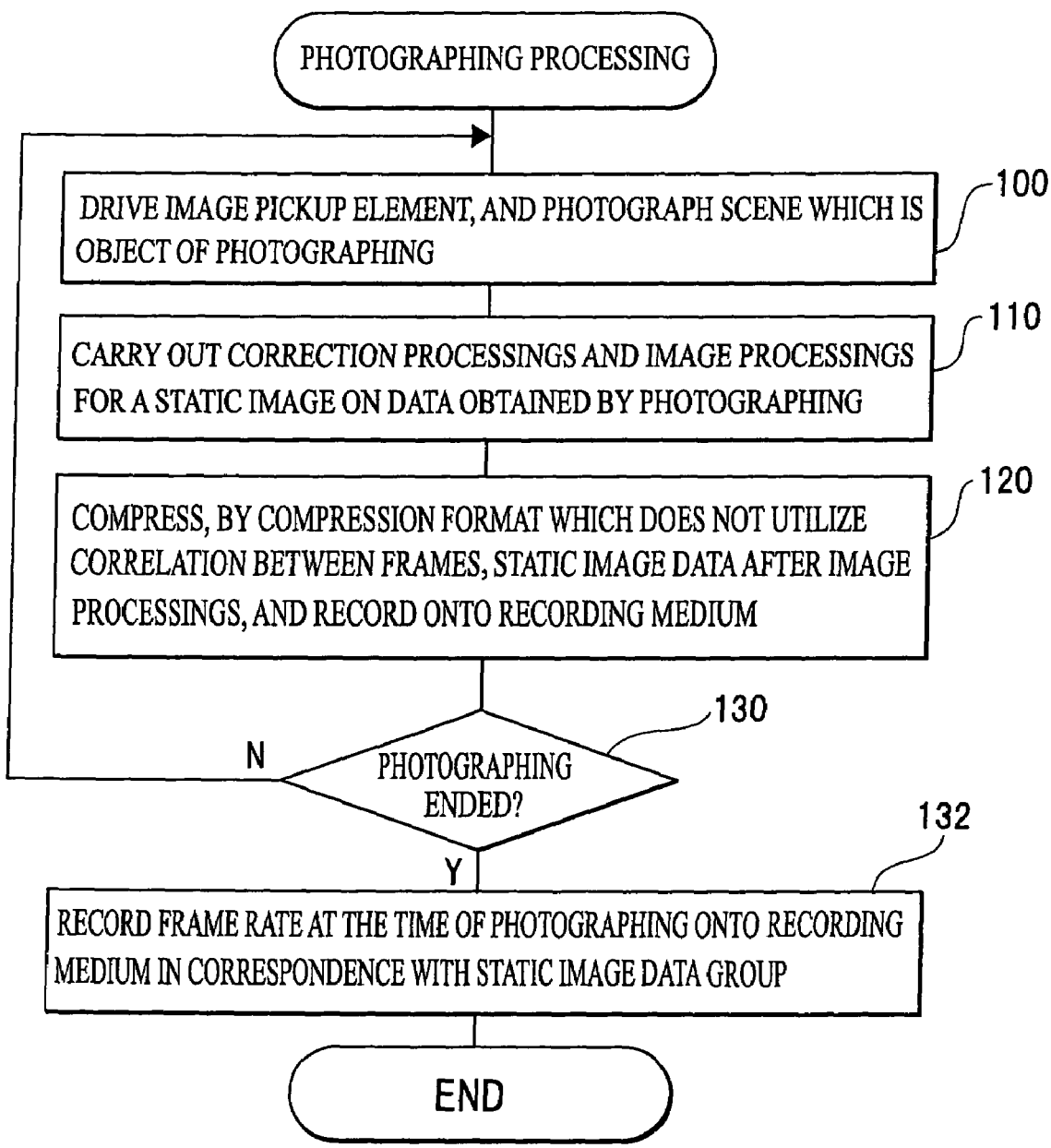
FIG. 5 is a flowchart showing contents of photographing processing relating to the second embodiment.

Next, photographing processing relating to the present second embodiment will be described with reference to FIG. 5 as the operation of the present second embodiment. In the photographing processing relating to the present second embodiment, when the judgment in step 130 is affirmative due to the end of photographing being instructed, in subsequent step 132, the recording/reading control section 36 is controlled such that frame rate information, which expresses the frame rate at the time of photographing, is recorded onto the recording medium 34 as attribute information of the static image data group, in correspondence with the static image data group which is already recorded on the recording medium 34. An example of the format of the data recorded on the recording medium 34 is shown in FIG. 7.

Figure 7:
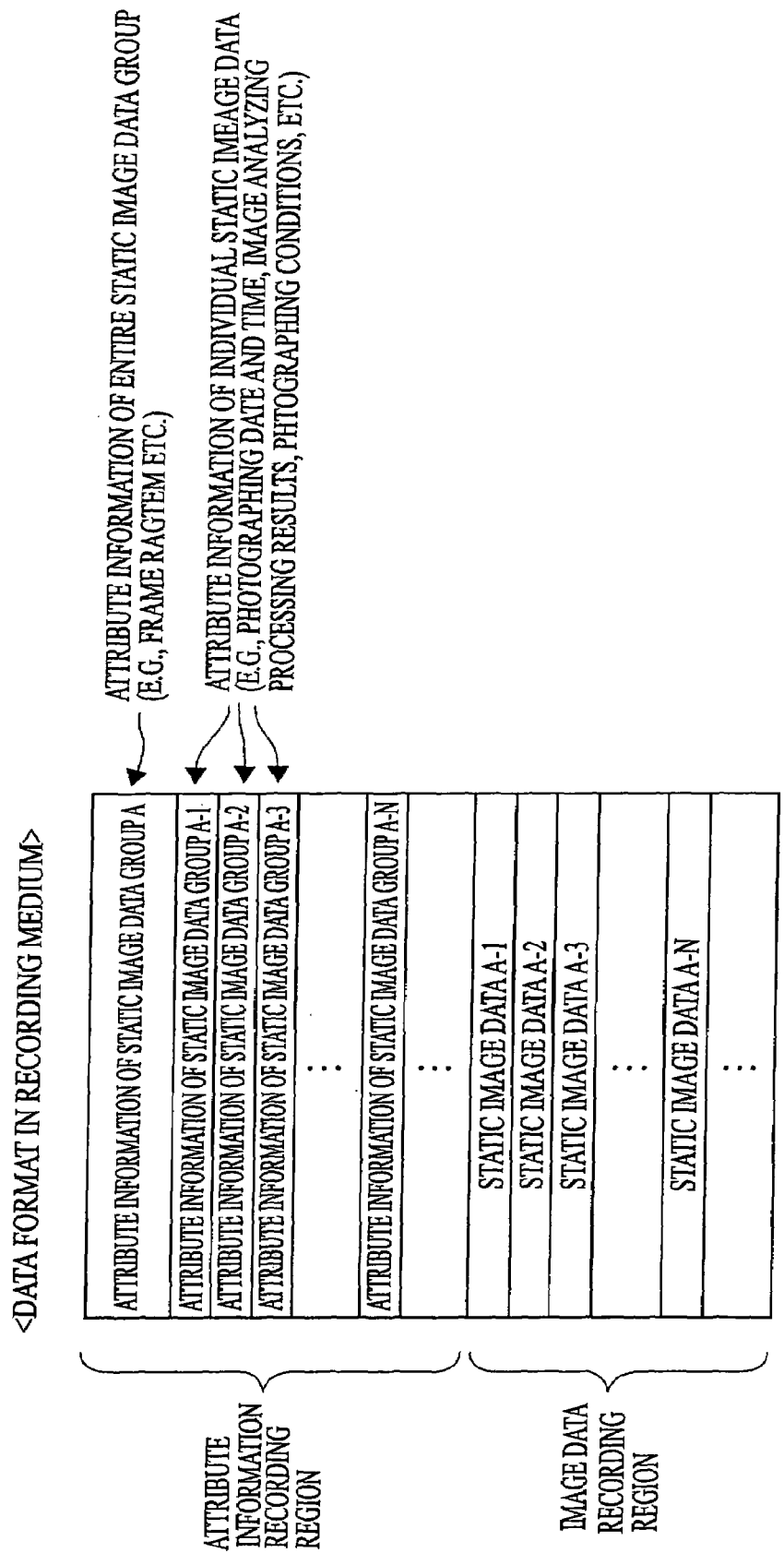
FIG. 7 is an image diagram showing an example of a data format in a recording medium.

In FIG. 7, the individual static image data (compressed static image data) of the static image data group (compressed static image data group) are successively recorded in an image data recording region. Further, at an attribute information recording region, there are provided a first region, which is for recording attribute information of the entire static image data group (denoted as static image data group A in FIG. 7) which was photographed by a single photographing operation without being interrupted, and second regions, which are for recording the attribute information of the individual static image data. Due to the processing of above-described step 132, the frame rate information is recorded in the first region of the attribute information recording region, as one attribute information of the entire static image data group which was photographed by one photographing operation. Further, information, such as the photographing dates and times or the like, of the individual static image data are respectively recorded in the second regions of the attribute information recording region.

Figure 6:
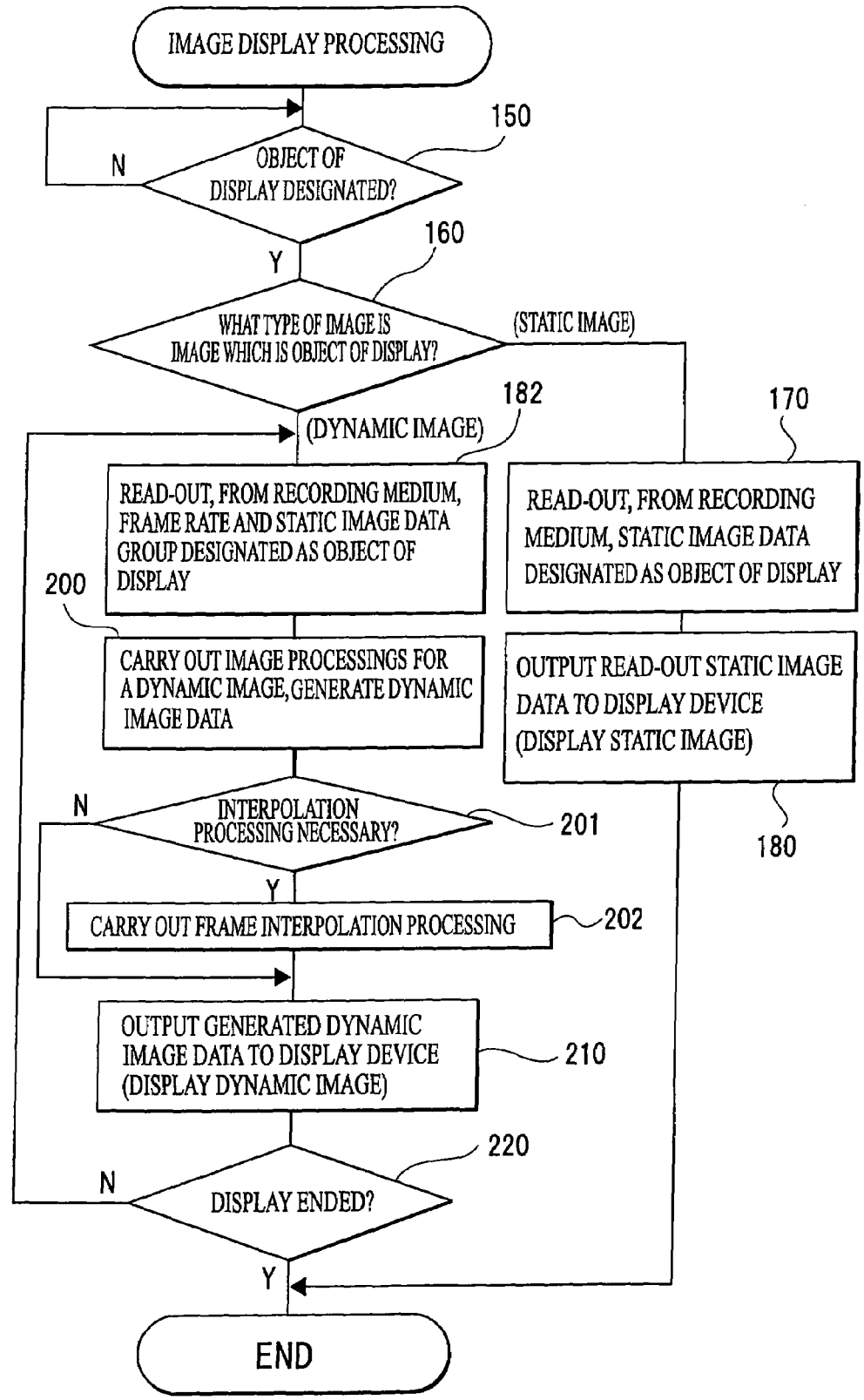
FIG. 6 is a flowchart showing contents of image display processing relating to the second embodiment.

Next, the image display processing relating to the present second embodiment will be described with reference to FIG. 6. In the image display processing relating to the present second embodiment, in a case in which the image which is the object of display and the form of the display are designated by the user and the designated form of display is a dynamic image, the routine moves on from step 160 to step 182, and the recording/reading control section 36 is instructed to read-out, from the recording medium 34, the compressed static image data group which is designated as the object of display, as well as the frame rate information. In this way, the compressed static image data group which is designated as the object of display is successively read-out from the image data recording region of the recording medium 34 by the information recording/reading device 32 under the control of the information recording/reading control section 36, and the frame rate information is read-out from the first region of the attribute information recording region of the recording medium 34 by the information recording/reading device 32 under the control of the information recording/reading control section 36.

Due to the compressed static image data group, which is read-out from the recording medium 34, being successively transferred to the compression/decompression processing section 26 and being decompressed thereat in the same way as in the first embodiment, the original static image data group is regenerated. Thereafter, the regenerated static image data are successively transferred from the compression/decompression processing section 26 via the data bus 20 to the dynamic image processing section 22, and image processing for a dynamic image is carried out by the dynamic image processing section 22 (step 200). On the other hand, the frame rate information, which is read-out from the recording medium 34, is outputted from the CPU 38 to the frame rate detecting section 48. At the frame rate detecting section 48, it is judged whether or not the frame rate, which is expressed by the inputted frame rate information, is lower than a frame rate threshold value which is set in advance, and it is thereby judged whether or not frame interpolation processing is needed (step 201).

In a case in which this judgment is negative, without carrying out frame interpolation processing, the static image data group which has undergone the image processing for a dynamic image (i.e., the dynamic image data) is successively transferred from the dynamic image processing section 22 to the display control section 30, and the dynamic image data is displayed on the display device 28 as a dynamic image (step 210). However, in a case in which it is judged that frame interpolation processing is needed, the judgment result is inputted from the frame rate detecting section 48 via the data control section 40 to the frame interpolation processing section 50, and is inputted to the CPU 38 as well.

In this way, the CPU 38 instructs, via the data control section 40, that the static image data group, which has undergone image processing for a dynamic image, be successively transferred from the dynamic image processing section 22 via the data bus 20 to the frame interpolation processing section 50. On the basis of the static image data group which is successively transferred from the dynamic image processing section 22, the frame interpolation processing section 50 carries out frame interpolation processing (step 202) which generates static image data corresponding to a lacking frame in a case in which that static image data group is outputted as a dynamic image of a predetermined frame rate, by interpolation on the frame memory 52 from the static image data of frames before and after the lacking frame in the order of the photographing dates and times. Then, the transferred static image data and the static image data generated by the frame interpolation processing are successively transferred to the display control section 30 as dynamic image data in a predetermined order (the order of display on the display device 28). In this way, the static image data group, which was obtained by photographing by the image pickup element 12, is displayed on the display device 28 (step 210) as a dynamic image of a higher frame rate than the frame rate at the time of photographing by the image pickup element 12.

In this way, in the present second embodiment, when displaying a dynamic image on the display device 28, frame interpolation processing is carried out as needed on the basis of the frame rate at the time of photographing by the image pickup element 12. Therefore, the image quality of the dynamic image which is displayed on the display device 28 can be improved as compared with the frame rate at the time of photographing by the image pickup element 12. Further, even in cases in which there is the need to display the dynamic image on the display device 28 at a high resolution and a high frame rate, there is no need for the sections relating to the photographing and to the generating of the static image data and to the recording of the static image data onto the recording medium 34 (i.e., the image pickup element 12 and peripheral circuits thereof, the static image processing section 24, and the like), to be structured so as to be able to carry out processing at a high resolution and at a high frame rate corresponding thereto. Lowering of the cost of and improvement in the applicability of the photographing and recording device 46 can be realized.

Note that, in the above explanation, an aspect is described in which the frame interpolation processing is carried out in a case in which the frame rate at the time of photographing, which is expressed by the frame rate information, is lower than a threshold value. However, the present invention is not limited to the same. The static image data group, which has undergone the image processing for a dynamic image, may be displayed on the display device 28 at the same frame rate as at the time of photographing, and the parameters of the image processing for a dynamic image may be switched, such as smoothing processing may be applied more strongly in order to reduce the strange feeling when viewed, or the amount of the high frequency components of the spatial frequency which are eliminated by the filtering processing may be increased so as to make the sharpness even lower, or the like. There is the need for a large-capacity memory, such as the frame memory 52 or the like, in order to newly generate the static image data of a lacking frame by the frame interpolation processing. However, in a case in which the aforementioned smoothing processing or filtering processing is carried out instead of the frame interpolation processing, a frame memory or the like is not needed, and the cost of the photographing and recording device can be reduced. Further, in a case in which the frame rate at the time of photographing is higher than the frame rate at the time of displaying the dynamic image on the display device 28, processing for deleting the static image data of superfluous frames (thinning processing) may, of course, be carried out.

Third Embodiment

A third embodiment of the present invention will be described next. Note that portions which are the same as those of the first embodiment are denoted by the same reference numerals, and description thereof is omitted. Only the portions which are different from the first embodiment will be described.

Figure 8:
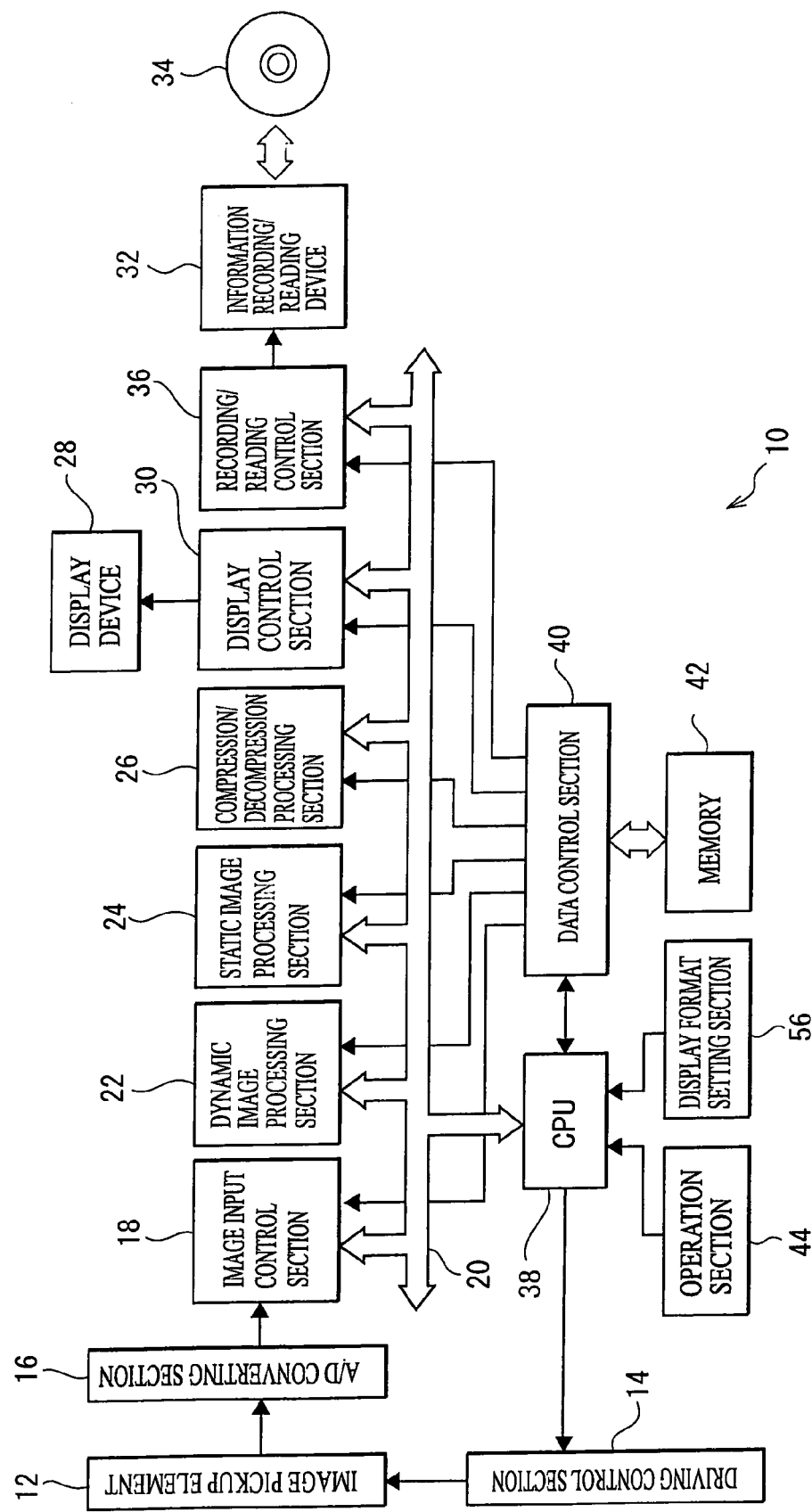
FIG. 8 is a block diagram showing the schematic structure of an image photographing and recording device relating to a third embodiment.

In a photographing and recording device 54 relating to the present third embodiment (see FIG. 8), arbitrary display devices which are separate from the photographing and recording device 54 (e.g., display devices of respectively different display formats for displaying dynamic images or static images), can be connected as the display device 28. A display format setting section 56, which sets the display format (e.g., VGA, HDTV-D1 to D5) of the display device 28 which is connected to the photographing and recording device 54, is connected to the CPU 38. The display format setting section 56 may be structured so as to set the display format by operation by a user, or it is possible to employ a structure in which the display format is sensed automatically by sensing the signal from the display device 28 or by carrying out communication with the display device 28.

Figure 9:
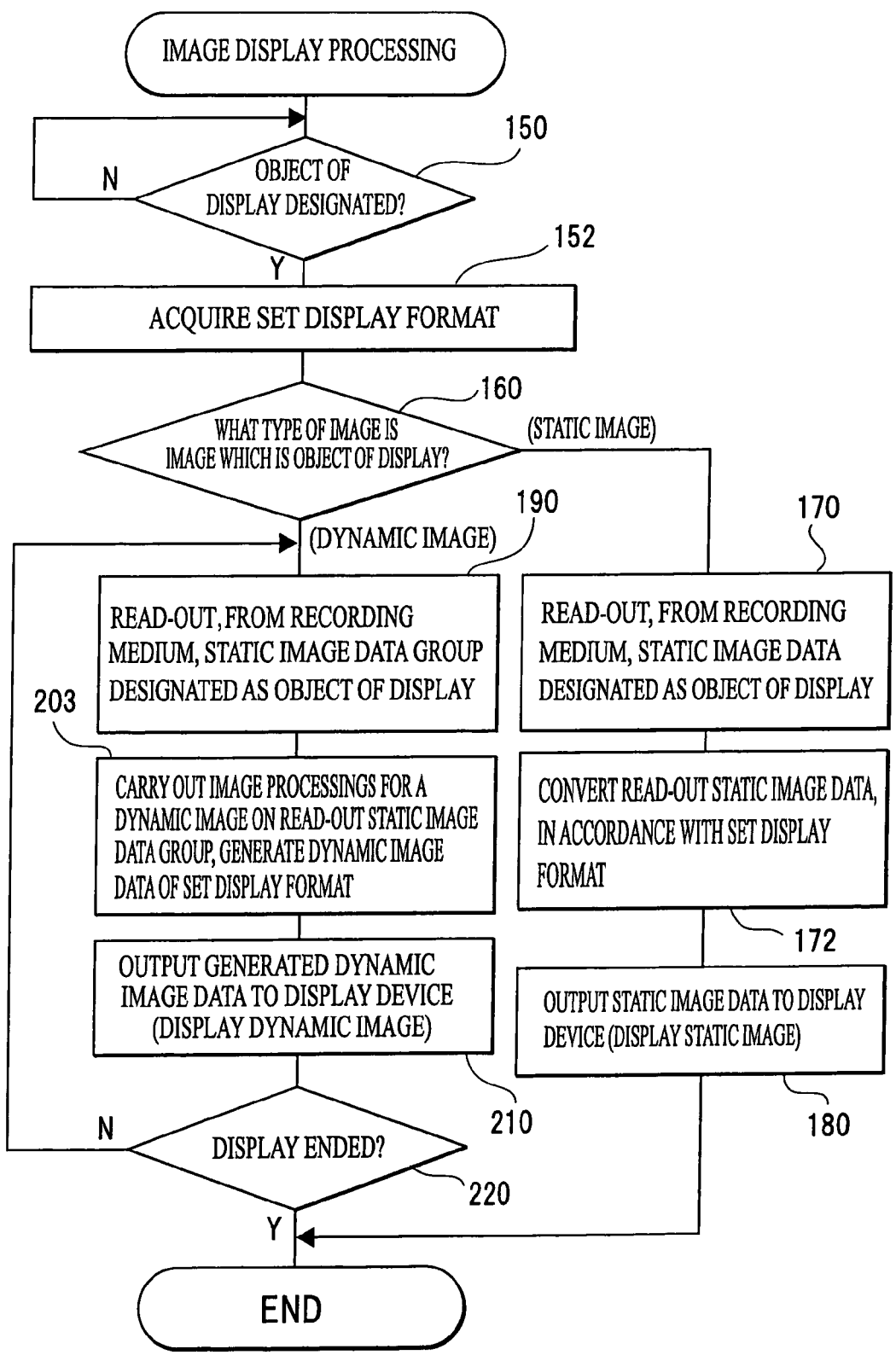
FIG. 9 is a flowchart showing contents of image display processing relating to the third embodiment.

Next, image display processing relating to the present third embodiment will be described with reference to FIG. 9. In the image display processing relating to the present third embodiment, in a case in which the image which is the object of display and the form of display are designated by the user and the designated form of display is a static image, the compressed static image data which is designated as the object of display is read-out from the recording medium 34, is transferred from the information recording/reading control section 36 to the compression/decompression processing section 26, and is subjected to decompression processing (step 170). Thereafter, in step 172, the CPU 38, via the data control section 40, instructs the compression/decompression processing section 26 to transfer to the static image processing section 24 the static image data which was regenerated by the decompression processing. Further, the CPU 38 informs the static image processing section 24 of the display format set by the display format setting section 56, and instructs the static image processing section 24 to carry out the processing of converting the transferred static image data into static image data corresponding to the notified display format.

In this way, the static image data, which is regenerated by the decompression processing, is transferred from the compression/decompression processing section 26 to the static image processing section 24. The static image processing section 24 carries out image processing for a static image corresponding to the notified display format, on the transferred static image data. Examples of image processing for a static image which correspond to the display format are, for example, resolution converting processing carried out by switching parameters such that the resolution (number of pixels) of the transferred static image data coincides with the resolution (number of pixels) corresponding to the notified display format, and the like. In this way, static image data suited to the display format of the display device 28 is obtained. Then, in next step 180, the static image processing section 24 is instructed, via the data control section 40, to transfer to the display control section 30 the static image data which has undergone the image processing for a static image, and the display control section 30 is instructed to display the transferred static image data as a static image on the display device 28. In this way, the static image data, which has undergone image processing for a static image corresponding to the display format, is transferred via the data bus 20 to the display control section 30, and is displayed on the display device 28 as a static image.

On the other hand, in a case in which the image which is the object of display and the form of the display are designated by the user and the designated form of the display is a dynamic image, the compressed static image data group which is designated as the object of display is read-out from the recording medium 34, is successively transferred to the compression/decompression processing section 26, and is subjected to decompression processing thereat (step 190). Thereafter, in next step 203, the static image data group regenerated by the decompression processing is successively transferred from the compression/decompression processing section 26 to the dynamic image processing section 22. The dynamic image processing section 22 is notified of the display format set by the display format setting section 56, and is instructed to carry out image processing for a dynamic image which correspond to the notified display format, on the successively-transferred static image data group.

In this way, the static image data which is regenerated by the decompression processing is successively transferred from the compression/decompression processing section 26 to the dynamic image processing section 22. Further, the dynamic image processing section 22 switches, in accordance with the notified display format, the parameters of some of the image processing among the image processing for a dynamic image which are to be carried out on the static image data group which is successively transferred from the compression/decompression processing section 26. Thereafter, the dynamic image processing section 22 successively carries out the image processing for a dynamic image on the static image data group. Examples of the image processing for a dynamic image which correspond to the display format include, for example, resolution converting processing which is carried out by switching parameters such that the resolution (number of pixels) of the transferred static image data coincides with the resolution (number of pixels) corresponding to the notified display format, filtering processing which is carried out by switching parameters in accordance with the resolution corresponding to the display format, and the like. A static image data group which is suited to the display format of the display device 28 is obtained. By transferring this static image data group to the display control section 30 as dynamic image data and instructing display of a dynamic image, a dynamic image which is suited to the display format of the display device 28 can be displayed on the display device 28.

In this way, in the present third embodiment, when a static image or a dynamic image is displayed on the display device 28, by carrying out image processing for a static image or for a dynamic image which correspond to the display format of the display device 28, the static image or the dynamic image which is designated as the object of display can be displayed on the display device 28 regardless of the display format of the display device 28. Accordingly, the applicability of the photographing and recording device 46 can be improved.

Fourth Embodiment

Figure 10:
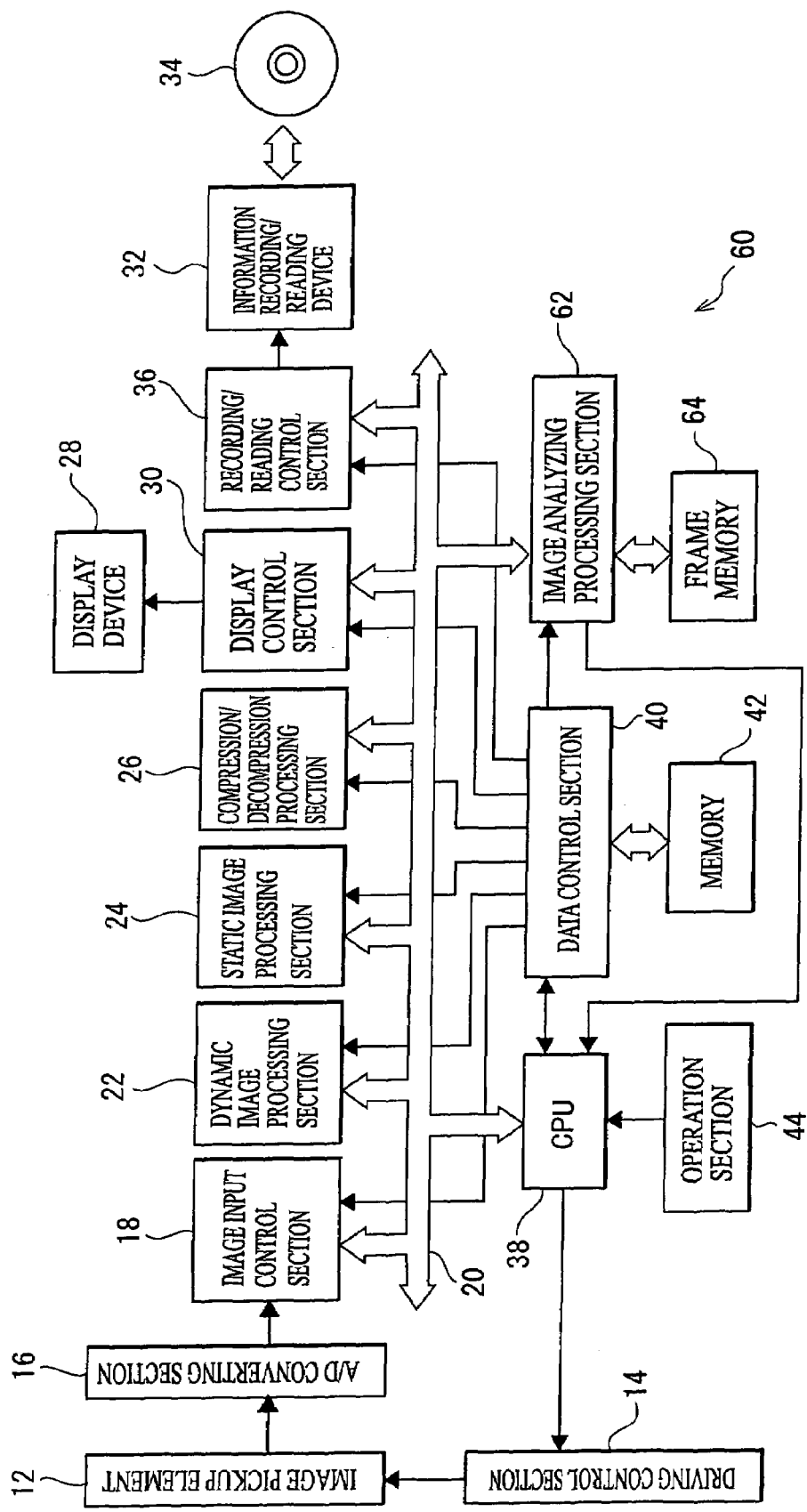
FIG. 10 is a block diagram showing the schematic structure of an image photographing and recording device relating to a fourth embodiment.

A fourth embodiment of the present invention will be described next. Note that portions which are the same as those of the first embodiment are denoted by the same reference numerals, and description thereof is omitted. Only the portions which are different from the first embodiment will be described. In a photographing and recording device 60 relating to the present fourth embodiment (see FIG. 10), an image analyzing processing section 62, which carries out image analyzing processing on static image data which is read-out from the recording medium 34, is connected to the data bus 20. A frame memory 64 used in the image analyzing processing is connected to the image analyzing processing section 62. The image analyzing processing section 62 is also connected to the CPU 38.

Figure 11:
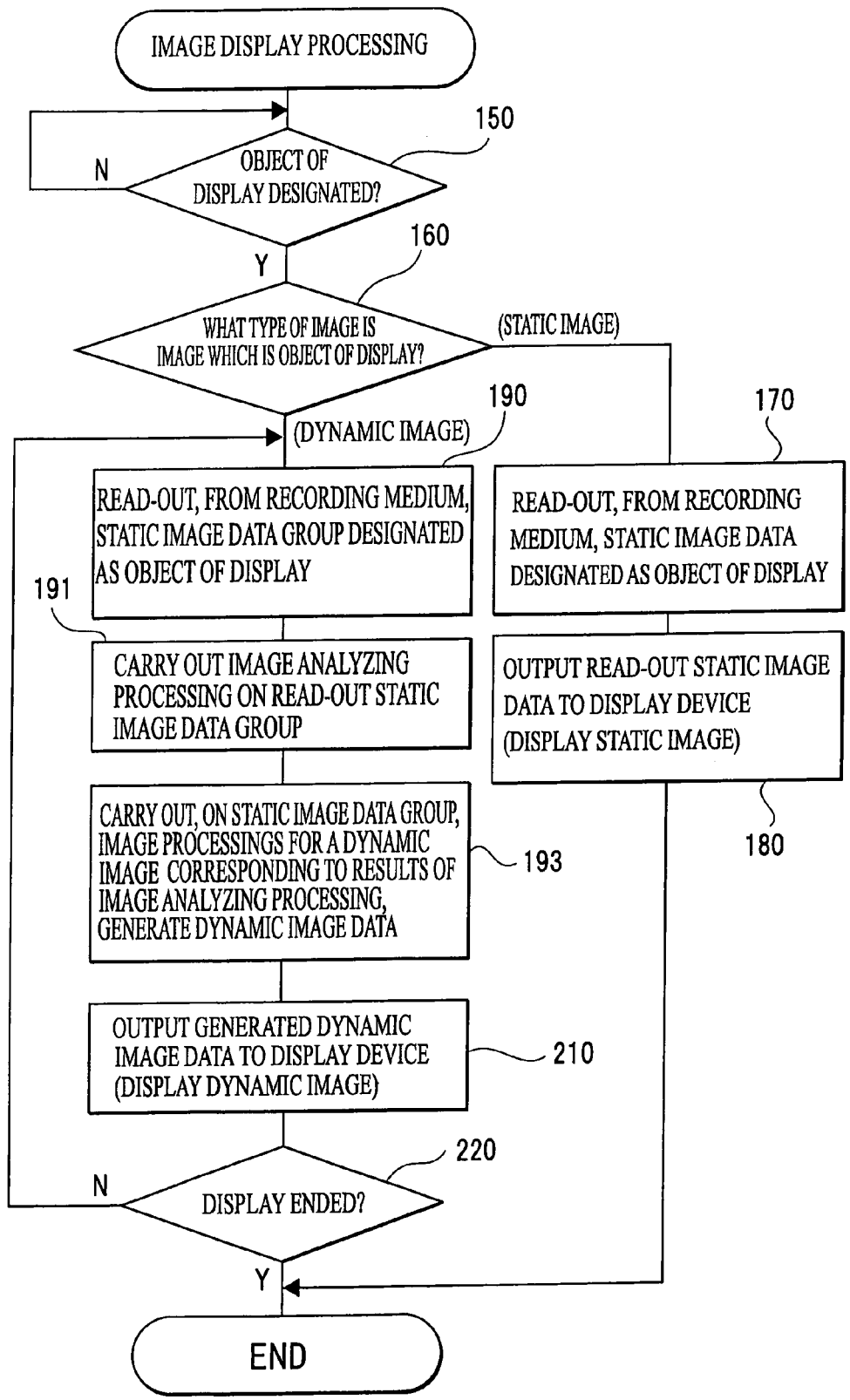
FIG. 11 is a flowchart showing contents of image display processing relating to the fourth embodiment.

Next, the image display processing relating to the present fourth embodiment will be described with reference to FIG. 11. In the image display processing relating to the present fourth embodiment, in a case in which an image which is an object of display and the form of display are designated by the user and the designated form of display is a dynamic image, the compressed static image data group designated as the object of display is read-out from the recording medium 34, is successively transferred to the compression/decompression processing section 26, and is subjected to decompression processing thereat (step 190). Thereafter, in next step 191, the static image data group which is regenerated by the decompression processing is successively transferred from the compression/decompression processing section 26 to the image analyzing processing section 62, and the image analyzing processing section 62 is instructed to carry out image analyzing processing on the successively-transferred static image data. In this way, the static image data which is regenerated by decompression processing is successively transferred from the compression/decompression processing section 26 to the image analyzing processing section 62, and the image analyzing processing section 62 carries out image analyzing processing on the static image data group, which is successively transferred from the compression/decompression processing section 26, by using the frame memory 64. Note that an example of the image analyzing processing at the image analyzing processing section 62 is, for example, processing which detects the direction of movement of the subject of photographing in each of the static image data of the successively-transferred static image data group. However, processing which detects another characteristics may be used.

Further, in next step 193, the CPU 38 causes the image analyzing processing section 62 to successively transfer the static image data group, which has undergone the image analyzing processing, from the image analyzing processing section 62 to the dynamic image processing section 22, and notifies the dynamic image processing section 22 of the results of the image analyzing processing at the image analyzing processing section 62, and instructs the dynamic image processing section 22 to carry out image processing for a dynamic image, which correspond to the notified results of the image analyzing processing, on the successively-transferred static image data group.

In this way, the static image data which has undergone the image analyzing processing is successively transferred from the image analyzing processing section 62 to the dynamic image processing section 22. Further, the dynamic image processing section 22 switches, in accordance with the notified results of the image analyzing processing, the parameters of some of the image processing among the image processing for a dynamic image which are to be carried out on the static image data group which is successively transferred from the image analyzing processing section 62. Thereafter, the dynamic image processing section 22 successively carries out the image processing for a dynamic image on the static image data group. Examples of image processing for a dynamic image which correspond to results of image analyzing processing are, for example, filtering processing which is carried out by switching the characteristics of the filter in accordance with direction of movement of the subject of photographing which is detected by the image analyzing processing by the image analyzing processing section 62, and the like. In this way, the image quality and the like of the dynamic image displayed on the display device 28 can be optimized in accordance with the image contents and the like of the static image data group designated as the object of display.

Fifth Embodiment

Figure 12:
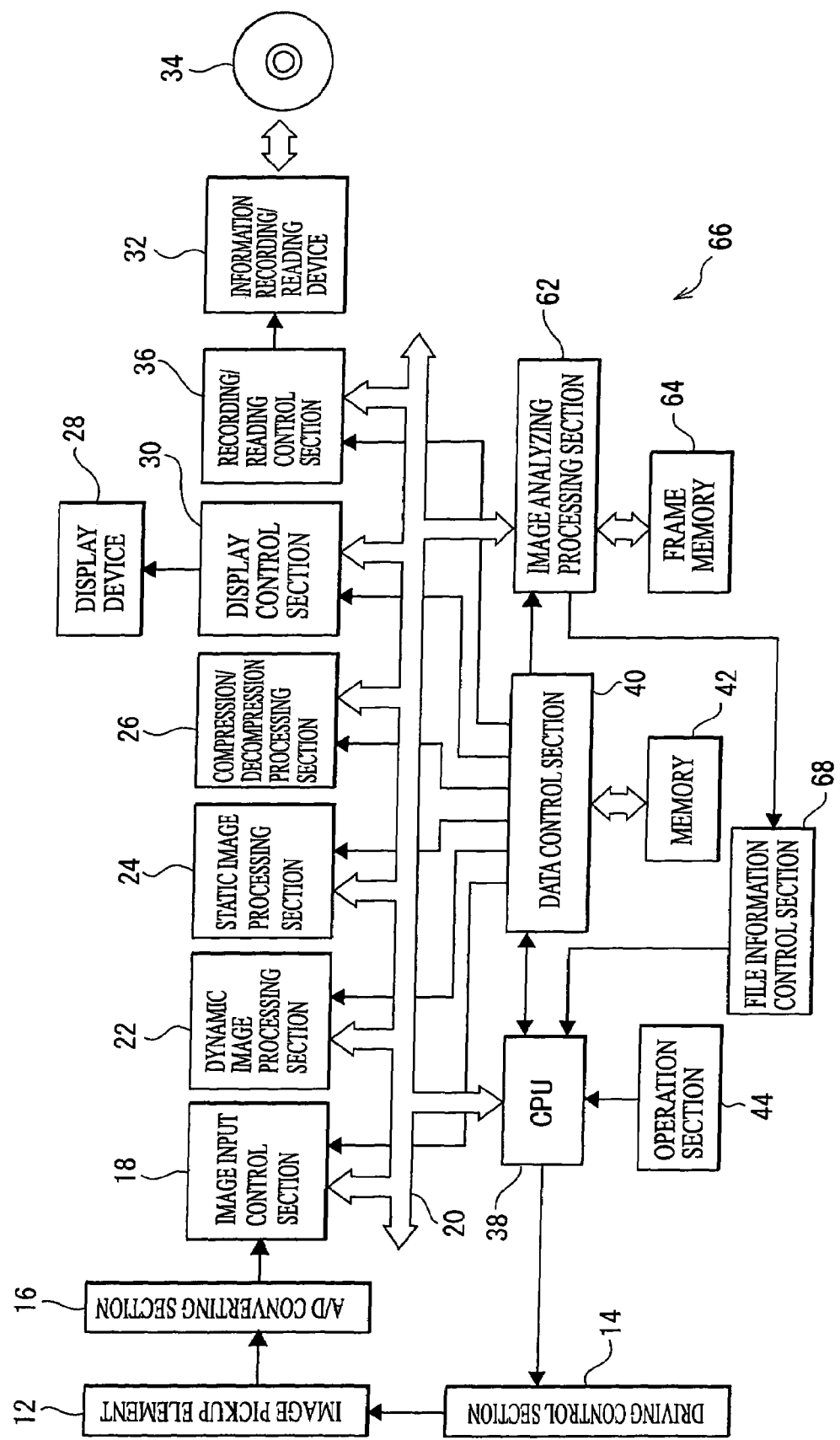
FIG. 12 is a block diagram showing the schematic structure of an image photographing and recording device relating to a fifth embodiment.
Figure 13:
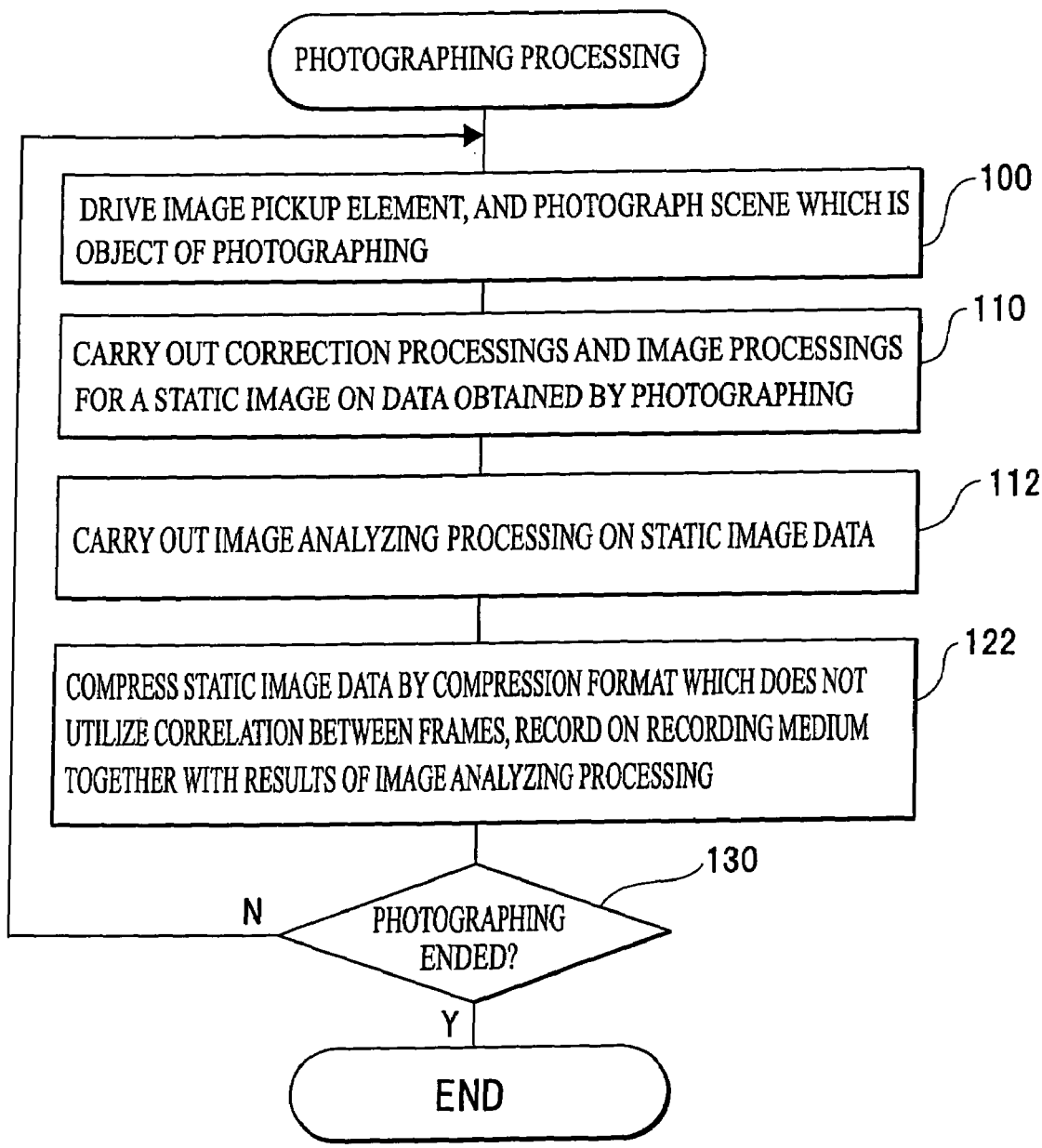
FIG. 13 is a flowchart showing contents of photographing processing relating to the fifth embodiment.
Figure 14:
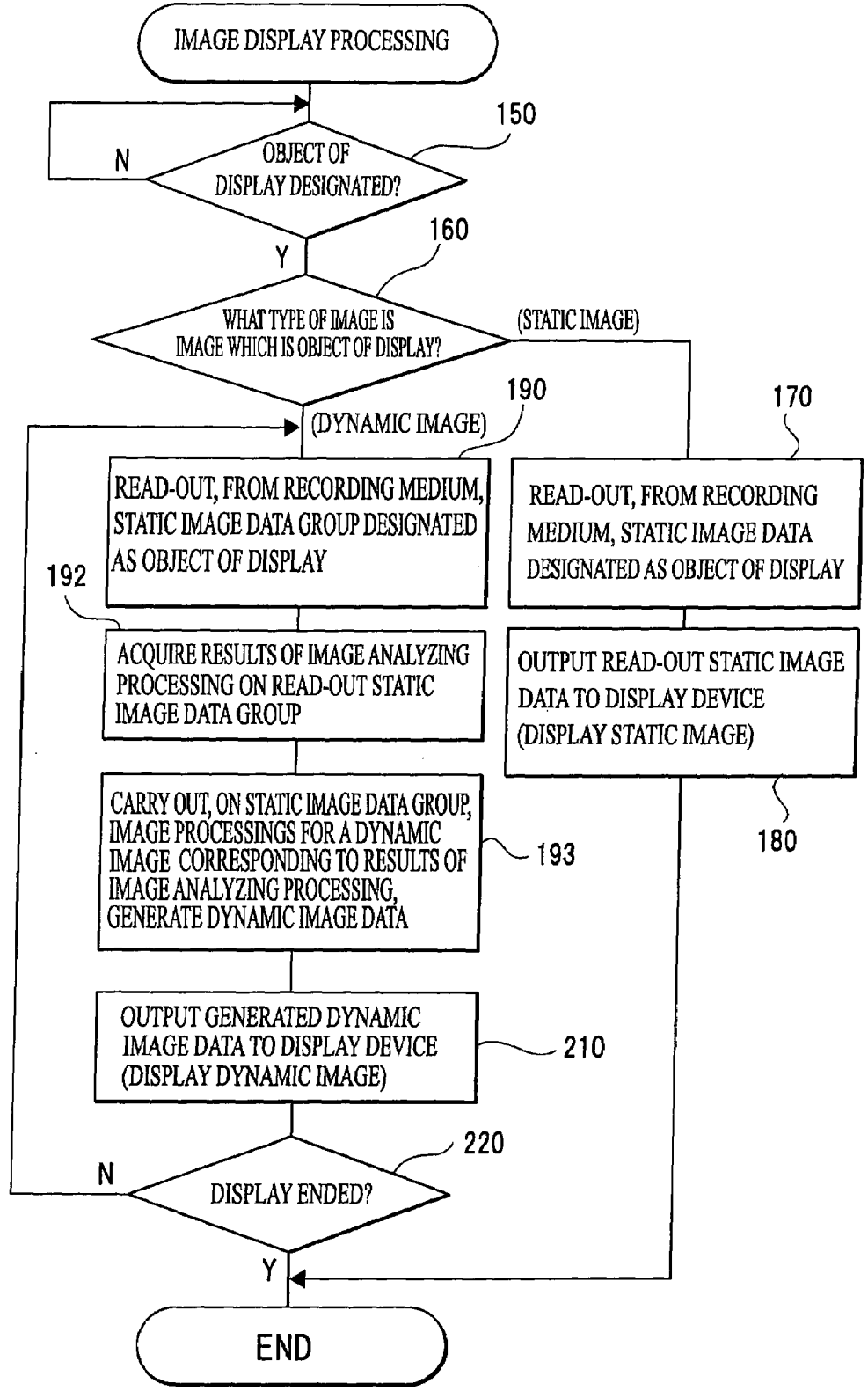
FIG. 14 is a flowchart showing contents of image display processing relating to the fifth embodiment.

Next, a fifth embodiment of the present invention will be described with reference to FIGS. 12, 13, and 14. Note that portions which are the same as those of the fourth embodiment and the second embodiment are denoted by the same reference numerals, and description thereof is omitted. Only the portions which are different from the fourth embodiment will be described. In a photographing and recording device 66 relating to the present fifth embodiment (see FIG. 12), a file information control section 68 is connected to the image analyzing processing section 62, and the file information control section 68 is connected to the CPU 38. The results of the image analyzing processing at the image analyzing processing section 62 are inputted to the file information control section 68 from the image analyzing processing section 62. The file information control section 68 manipulates/edits the inputted results of the image analyzing processing into attribute information to be recorded in the attribute information recording region of the recording medium 34 (see FIG. 7), and outputs them to the CPU 38.

Next, the photographing processing relating to the present fifth embodiment will be described with reference to FIG. 13. In the photographing processing relating to the present fifth embodiment, the image pickup element 12 is driven, and image pickup of the scene which is the object of photographing is started (step 100). The image pickup data which is successively inputted to the image input control section 18 is transferred to the static image processing section 24, and the static image processing section 24 is made to carry out correction processing and image processing for a static image (step 110). Thereafter, in next step 112, the static image data group, which has been obtained through the correction processing and the image processing for a static image, is successively transferred from the static image processing section 24 to the image analyzing processing section 62, and the image analyzing processing section 62 is instructed to carry out image analyzing processing on the successively-transferred static image data. In this way, by using the frame memory 64, the image analyzing processing section 62 carries out image analyzing processing on the static image data group which is successively transferred from the static image processing section 24. Further, the results of the image analyzing processing by the image analyzing processing section 62 are successively inputted to the file information control section 68. The file information control section 68 manipulates/edits the successively-inputted results of the image analyzing processing into attribute information to be recorded in the second regions of the attribute information recording region of the recording medium 34, and successively outputs them to the CPU 38.

Then, in next step 122, the image analyzing processing section 62 is instructed, via the data control section 40, to successively transfer the static image data which has undergone the image analyzing processing to the compression/decompression processing section 26, and the compression/decompression processing section 26 is instructed to compress the static image data in a predetermined compression format, and is instructed to transfer the compressed static image data to the recording/reading control section 36. Further, the attribute information inputted from the file information control section 68 (i.e., information expressing the results of the image analyzing processing) is transferred to the recording/reading control section 36, and the recording/reading control section 36 is instructed to record the compressed static image data and the transferred attribute information onto the recording medium 34. In this way, the static image data which has undergone the image analyzing processing is successively transferred from the image analyzing processing section 62 to the compression/decompression processing section 26, and is compressed in a predetermined compression format, and thereafter, is successively transferred to the recording/reading control section 36 as compressed static image data. This compressed static image data is, together with the attribute information expressing the results of the image analyzing processing, successively recorded on the recording medium 34 via the information recording/reading device 32.

Next, the image display processing relating to the present fifth embodiment will be described with reference to FIG. 14. In the image display processing of the present fifth embodiment, in a case in which the image which is the object of display and the form of the display are designated by the user and the designated form of the display is a dynamic image, the compressed static image data group which is designated as the object of display is read-out from the recording medium 34, is successively transferred to the compression/decompression processing section 26, and is subjected to decompression processing (step 190). Thereafter, in step 192, due to the attribute information, which corresponds to the compressed static image data group read-out from the recording medium 34, being read-out from the second regions of the attribute information recording region of the recording medium 34, the results of the image analyzing processing which was executed in the previously-described photographing processing are acquired. Then, in next step 193, the static image data group regenerated by the decompression processing is successively transferred from the compression/decompression processing section 26 to the dynamic image processing section 22. The dynamic image processing section 22 is notified of the image analyzing processing results which were acquired in step 192, and is instructed to carry out image processing for a dynamic image which correspond to the notified image analyzing processing results, on the successively-transferred static image data group.

In this way, the static image data which is regenerated by the decompression processing is successively transferred from the compression/decompression processing section 26 to the dynamic image processing section 22. The dynamic image processing section 22 switches, in accordance with the notified image analyzing processing results, the parameters of some of the image processing among the image processing for a dynamic image which are to be carried out on the static image data group which is successively transferred from the compression/decompression processing section 26. Thereafter, the dynamic image processing section 22 successively carries out the image processing for a dynamic image on the static image data group. In this way, in the same way as in the fourth embodiment, the image quality and the like of the dynamic image displayed on the display device 28 can be optimized in accordance with the image contents and the like of the static image data group which is designated as the object of display.

Sixth Embodiment

Figure 15:
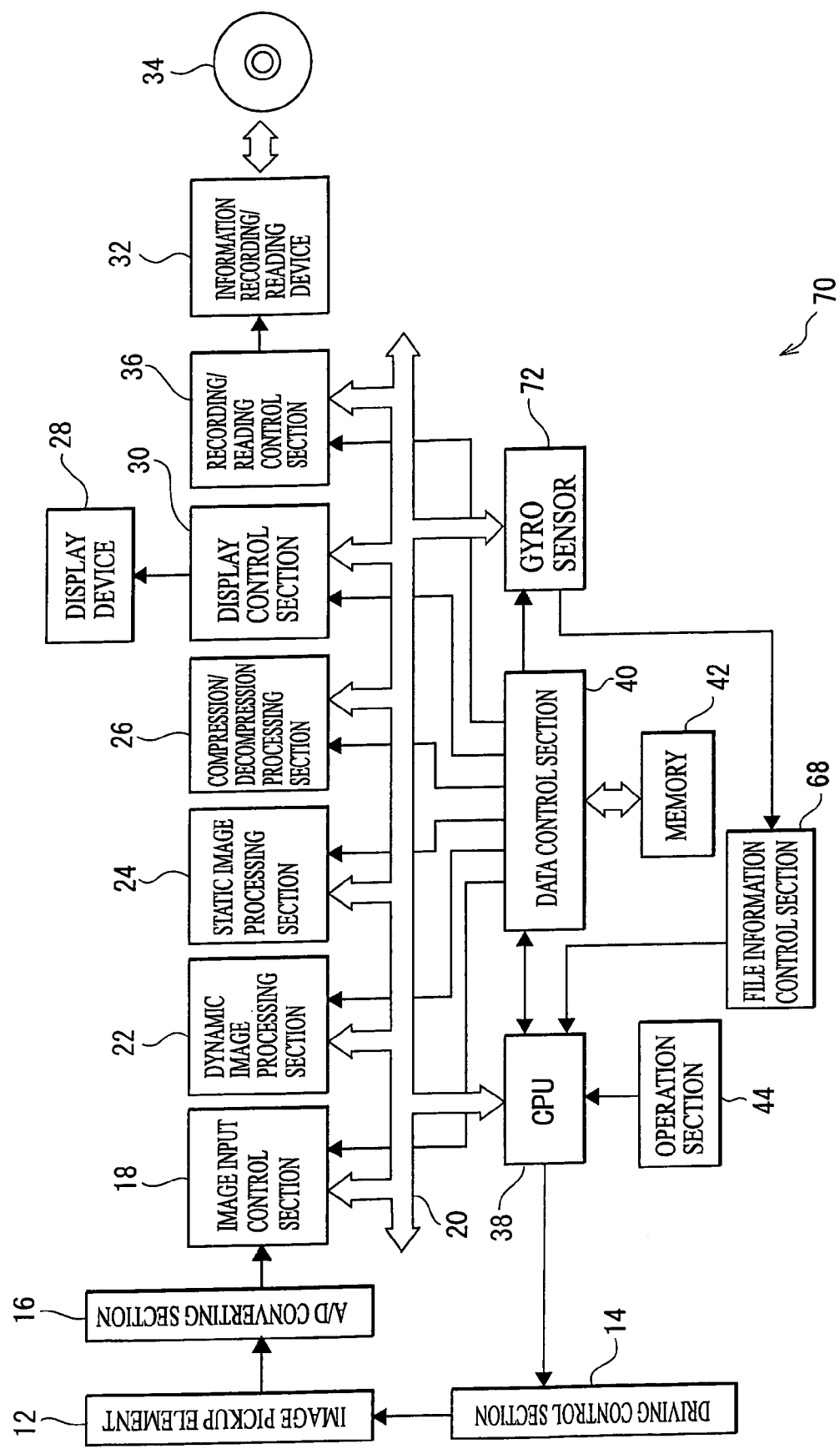
FIG. 15 is a block diagram showing the schematic structure of an image photographing and recording device relating to a sixth embodiment.
Figure 17:
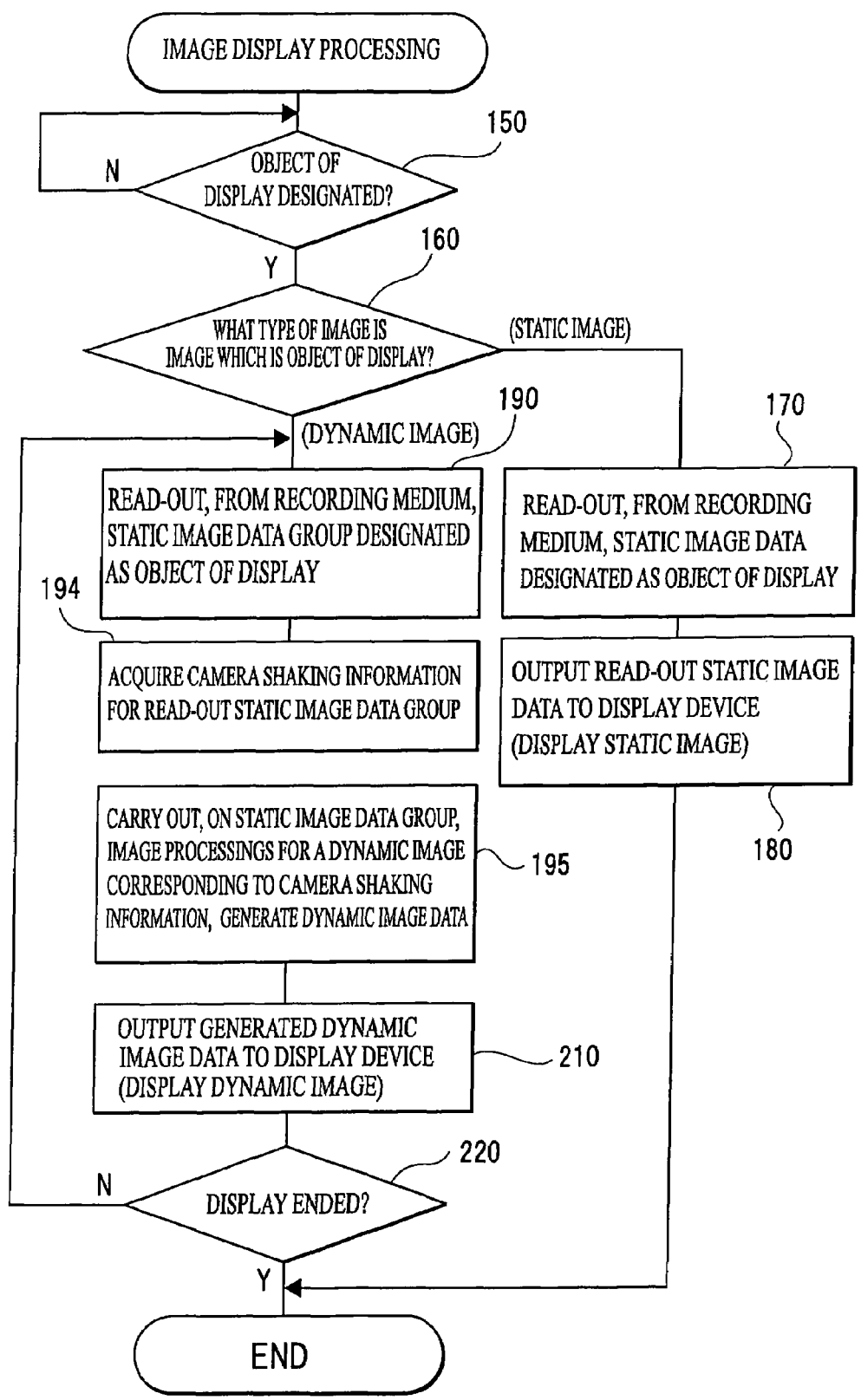
FIG. 17 is a flowchart showing contents of image display processing relating to the sixth embodiment.

Next, a sixth embodiment of the present invention will be described with reference to FIGS. 15, 16, and 17. Note that portions which are the same as those of the fifth embodiment are denoted by the same reference numerals, and description thereof is omitted. Only the portions which are different from the fifth embodiment will be described. In a photographing and recording device 70 relating to the present sixth embodiment (see FIG. 15), the image analyzing processing section 62 and the frame memory 64 are omitted from the photographing and recording device 66 described in the fifth embodiment (FIG. 12), and instead, a gyro sensor 72, which can detect the amount of and the direction of camera shaking at the time of photographing, is provided. The gyro sensor 72 is connected to the file information control section 68. The file information control section 68 manipulates/edits the results of detection of the amount and direction of camera shaking at the time of photographing, which are inputted from the gyro sensor 72, into attribute information to be recorded in the attribute information recording region of the recording medium 34 (see FIG. 7), and outputs them to the CPU 38.

Next, the photographing processing relating to the present sixth embodiment will be described with reference to FIG. 16. In the photographing processing relating to the present sixth embodiment, the image pickup element 12 is driven, and image pickup of the scene which is the object of photographing is started (step 100). The image pickup data which is successively inputted to the image input control section 18 is transferred to the static image processing section 24, and the static image processing section 24 is made to carry out correction processing and image processing for a static image (step 110). During these steps, the gyro sensor 72 repeats the process of detecting the amount and the direction of camera shaking at the time of photographing, and the file information control section 68 repeats the processing of manipulating/editing, into attribute information, the results of detection of the amount and direction of the camera shaking at the time of photographing, which are inputted from the gyro sensor 72. In next step 114, the attribute information, which expresses the results of detection by the gyro sensor 72 of the amount and the direction of the camera shaking at the time of photographing, is acquired from the file information control section 68.

Then, in next step 124, the static image processing section 24 is instructed to successively transfer, to the compression/decompression processing section 26, the static image data which has undergone the correction processing and the image processing for a static image. The compression/decompression processing section 26 is instructed to compress the static image data in a predetermined compression format, and is instructed to transfer the compressed static image data to the recording/reading control section 36. Further, the attribute information inputted from the file information control section 68 (the information expressing the results of detection by the gyro sensor 72 of the amount and the direction of camera shaking at the time of photographing) is transferred to the recording/reading control section 36, and the recording/reading control section 36 is instructed to record the compressed static image data and the transferred attribute information onto the recording medium 34. In this way, the static image data is successively transferred from the static image processing section 24 to the compression/decompression processing section 26 and is compressed in a predetermined compression format, and thereafter, is successively transferred to the recording/reading control section 36 as compressed static image data. This compressed static image data is, together with the attribute information which expresses the results of detection by the gyro sensor 72 of the amount and direction of camera shaking at the time of photographing, successively recorded on the recording medium 34 via the information recording/reading device 32.

Next, the image display processing relating to the present sixth embodiment will be described with reference to FIG. 17. In the image display processing relating to the present sixth embodiment, in a case in which the image which is the object of display and the form of display are designated by the user and the designated form of display is a dynamic image, the compressed static image data group designated as the object of display is read-out from the recording medium 34, is successively transferred to the compression/decompression processing section 26, and is subjected to decompression processing thereat (step 190). Thereafter, in next step 194, by reading out, from the second regions of the attribute information recording region of the recording medium 34, the attribute information corresponding to the compressed static image data group read-out from the recording medium 34, the results of detection by the gyro sensor 72 of the amount and direction of camera shaking at the time of photographing, in the previously-described photographing processing, are acquired. Then, in next step 195, the static image data group which is regenerated by the decompression processing is successively transferred from the compression/decompression processing section 26 to the dynamic image processing section 22, and the dynamic image processing section 22 is notified of the results of detection of the amount and direction of camera shaking at the time of photographing which were acquired in step 194, and is instructed to carry out image processing for a dynamic image, which corresponds to the amount and direction of camera shaking at the time of photographing, on the successively-transferred static image data group.

In this way, the static image data which is regenerated by the decompression processing is successively transferred from the compression/decompression processing section 26 to the dynamic image processing section 22. The dynamic image processing section 22 switches, in accordance with the notified image analyzing processing results, the parameters of some of the image processing among the image processing for a dynamic image which are to be carried out on the static image data group successively transferred from the compression/decompression processing section 26. Thereafter, the dynamic image processing section 22 successively carries out the image processing for a dynamic image on the static image data group. Note that the image processing for a dynamic image which correspond to the results of detection of the amount and direction of camera shaking at the time of photographing include, for example, camera shaking correction processing which is carried out by changing the cut-out position from the original static image data in accordance with the results of detection of the amount and direction of camera shaking at the time of photographing, and the like. In this way, the image quality and the like of the dynamic image displayed on the display device 28 can be optimized in accordance with the photographing conditions at the time when the static image data group, which is designated as the object of display, is photographed (in this case, the amount and direction of camera shaking at the time of photographing).

Note that an example has been described above in which image processing for a static image are carried out on static image data which is recorded on the recording medium 34. However, the present invention is not limited to the same. Image processing for a static image may be carried out on static image data which is the object of display at the time when display of a static image onto the display device 28 is instructed, without carrying out the image processing for a static image (and the image processing for a dynamic image) on the static image data recorded on the recording medium 34.

Further, an example is described above in which static image data, which is compressed in a compression format which does not utilize correlation between frames, is recorded on a recording medium (the recording medium 34). However, the present invention is not limited to the same. The static image data may be recorded as is on a recording medium without being compressed, or a structure may be used in which the user can select whether to record the data in a compressed form or to record the data without the data being compressed.

Moreover, the above explanation describes the displaying of a static image or a dynamic image onto the display device 28, as an example of the outputting of static image data or dynamic image data. However, the present invention is not limited to the same, and, for example, the transmitting of the static image data or the dynamic image data to an information processing device such as a personal computer (PC) or the like, or the like may be carried out. In this case as well, it is preferable to switch the processing contents of the image processing for a static image and the image processing for a dynamic image in accordance with the data format which can be handled at the information processing device which is the output destination.

Still further, an aspect is described above in which the functions corresponding to the static image outputting means and the dynamic image outputting means relating to the present invention are provided at the image photographing and recording device relating to the present invention. However, the above functions may of course be provided at a device (e.g., a PC or the like) which is other than an image photographing and recording device and which has the function of reading out static image data recorded on a recording medium (the recording medium 34).

As described above, in the present invention, static image data, which is successively outputted by a photographing means repeatedly photographing a scene which is an object of photographing at a predetermined frame rate as a static image of a predetermined resolution, is successively recorded onto a recording medium either in a non-compressed state or in a state of being compressed by a compression method which does not utilize correlation between frames. When a static image which is an object of output is designated, the corresponding static image data is read-out from the recording medium and outputted. When a dynamic image as an object of output is designated, the corresponding static image data group is read-out from the recording medium, is subjected to image processing for a dynamic image, and is outputted as dynamic image data. Therefore, the present invention has the excellent effect of being able to output a photographed scene either as a static image or as a dynamic image with sufficient image quality.

Specific embodiments of the present invention have been described in detail, but the present invention is not to be limited to these embodiments, and is to be understood as encompassing all changes and modifications which are possible without deviating from the scope and the spirit of the present invention.

What is claimed is:

1. An image photographing and recording device comprising:
    a resolution setting section for setting a resolution at a time of photographing;
    a frame rate setting section for automatically setting a frame rate based on a resolution at a time of photographing, wherein the higher the resolution is set by the resolution setting section, the lower the frame rate is set;
    a photographing section repeatedly photographing a scene which is an object of photographing, at the frame rate set by the frame rate setting section as a static image of the resolution set by the resolution setting section;
    a recording section successively recording static image data, which is successively outputted by photographing by the photographing section, on a recording medium with the static image data in one of a non-compressed state and a state of being compressed by a compression method which does not utilize correlation between frames, and adding frame rate information, which expresses the frame rate at the time of the photographing by the photographing section, to the static image data which is successively recorded on the recording medium;
    a designating section for designating a static image or a dynamic image which is an object of output;
    a static image outputting section which, when a static image as the object of output is designated via the designating section, reads-out from the recording medium, static image data corresponding to the static image which is the object of output, and outputs the static image data; and
    a dynamic image outputting section which, when a dynamic image as the object of output is designated via the designating section, reads-out, from the recording medium, a static image data group corresponding to the dynamic image which is the object of output, and, thereafter, if the frame rate expressed byte frame rate information added to the static image data group which is read-out is lower than a predetermined frame rate, obtains an interpolation processing to generate static image data corresponding to a lacking frame from the static image data of frames before and after the lacking frame in order of the photographing dates and times, and outputs the data as dynamic image data.

2. The image photographing and recording device of claim 1, further comprising an image processing section carrying out image processing for a static image, on the static image data which is successively recorded on the recording medium by the recording section.

3. The image photographing and recording device of claim 1, further comprising a format detecting section detecting an output format of the dynamic image data which is suited to an output designation device which is a destination of output of the dynamic image data, wherein
    the dynamic image outputting section reads-out, from the recording medium, the static image data group corresponding to the dynamic image which is the object of output, and thereafter, switches processing contents of the image processing for a dynamic image in accordance with the output data format detected by the format detecting section.

4. The image photographing and recording device of claim 1, further comprising a first image analyzing section carrying out analyzing processing on the static image data group corresponding to the dynamic image which is the object of output, wherein
    the dynamic image outputting section reads-out, from the recording medium, the static image data group corresponding to the dynamic image which is the object of output, and thereafter, switches processing contents of the image processing for a dynamic image in accordance with results of analyzing processing by the first image analyzing section on the static image data group.

5. The image photographing and recording device of claim 1, further comprising a first image analyzing section carrying out analyzing processing on the static image data group corresponding to the dynamic image which is the object of output wherein the dynamic image outputting section reads-out from the recording medium, the static image data group corresponding to the dynamic image which is the object of output and thereafter, switches processing contents of the image processing for a dynamic image in accordance with results of analyzing processing by the first image analyzing section on the static image data group, the image photographing and recording device further comprises a second image analyzing section carrying out analyzing processing on the static image data successively outputted by photographing by the photographing section, the recording section adds analysis results information, which expresses results of analyzing processing by the second image analyzing section, to the static image data successively recorded on the recording medium, and the dynamic image outputting section reads-out, from the recording medium, the static image data group corresponding to the dynamic image which is the object of output, and thereafter, switches processing contents of the image processing for a dynamic image in accordance with the results of the analyzing processing which are expressed by the analyzing results information added to each of the static image data of the static image data group which is read-out.

6. The image photographing and recording device of claim 1, further comprising a photographing condition detecting section detecting photographing conditions at a time of photographing by the photographing section, wherein the recording section adds photographing condition information, which expresses the photographing conditions detected by the photographing condition detecting section, to the static image data successively recorded on the recording medium, and the dynamic image outputting section reads-out, from the recording medium, the static image data group corresponding to the dynamic image which is the object of output, and thereafter, switches processing contents of the image processing for a dynamic image in accordance with the photographing conditions expressed by the photographing condition information added to each of the static image data of the static image data group which is read-out.

7. The image photographing and recording device of claim 1, wherein if the frame rate expressed by the frame rate information added to the static image data group which is read out is higher than a predetermined frame rate, the dynamic image outputting section obtains processing for deleting the static image data corresponding to superfluous frames.

8. The image photographing and recording device of claim 1, further comprising an image analyzing section carrying out analyzing processing on the static image data successively outputted by photographing by the photographing section, wherein the recording section adds analysis results information, which expresses results of analyzing processing by the image analyzing section, to the static image data successively recorded on the recording medium, and the dynamic image outputting section reads-out from the recording medium, the static image data group corresponding to the dynamic image which is the object of output, and thereafter, switches processing contents of the image processing for a dynamic image in accordance with the results of the analyzing processing which are expressed by the analyzing results information added to each of the static image data of the static image data group which is read-out.

9. The image photographing and recording device of claim 2, further comprising a setting section which sets a frame rate for a time of photographing by the photographing section, wherein the photographing section carries out photographing at the frame rate set by the setting section, the recording section adds frame rate information, which expresses the frame rate at the time of photographing by the photographing section, to the static image data which is successively recorded on the recording medium, and the dynamic image outputting section reads-out, from the recording medium, the static image data group corresponding to the dynamic image which is the object of output, and thereafter, switches processing contents of the image processing for a dynamic image in accordance with the frame rate expressed by the frame rate information added to the static image data group which is read-out.

10. The image photographing and recording device of claim 2, further comprising a format detecting section detecting an output format of the dynamic image data which is suited to an output designation device which is a destination of output of the dynamic image data, wherein the dynamic image outputting section reads-out, from the recording medium, the static image data group corresponding to the dynamic image which is the object of output, and thereafter, switches processing contents of the image processing for a dynamic image in accordance with the output data format detected by the format detecting section.

11. The image photographing and recording device of claim 2, further comprising a first image analyzing section carrying out analyzing processing on the static image data group corresponding to the dynamic image which is the object of output, wherein the dynamic image outputting section reads-out, from the recording medium, the static image data group corresponding to the dynamic image which is the object of output, and thereafter, switches processing contents of the image processing for a dynamic image in accordance with results of analyzing processing by the first image analyzing section on the static image data group.

12. The image photographing and recording device of claim 2, further comprising a second image analyzing section carrying out analyzing processing on the static image data successively outputted by photographing by the photographing section, wherein the recording section adds analysis results information, which expresses results of analyzing processing by the second image analyzing section, to the static image data successively recorded on the recording medium, and the dynamic image outputting section reads-out, from the recording medium, the static image data group corresponding to the dynamic image which is the object of output, and thereafter, switches processing contents of the image processing for a dynamic image in accordance with the results of the analyzing processing which are expressed by the analyzing results information added to each of the static image data of the static image data group which is read-out.

13. The image photographing and recording device of claim 2, further comprising a first image analyzing section carrying out analyzing processing on the static image data group corresponding to the dynamic image which is the object of output, wherein the dynamic image outputting section reads-out, from the recording medium, the static image data group corresponding to the dynamic image which is the object of output, and thereafter, switches processing contents of the image processing for a dynamic image in accordance with results of analyzing processing by the first image analyzing section on the static image data group, the image photographing and recording device further comprises a second image analyzing section carrying out analyzing processing on the static image data successively outputted by photographing by the photographing section, the recording section adds analysis results information, which expresses results of analyzing processing by the second image analyzing section, to the static image data successively recorded on the recording medium, and the dynamic image outputting section reads-out, from the recording medium, the static image data group corresponding to the dynamic image which is the object of output, and thereafter, switches processing contents of the image processing for a dynamic image in accordance with the results of the analyzing processing which are expressed by the analyzing results information added to each of the static image data of the static image data group which is read-out.

14. The image photographing and recording device of claim 2, further comprising a photographing condition detecting section detecting photographing conditions at a time of photographing by the photographing section, wherein the recording section adds photographing condition information, which expresses the photographing conditions detected by the photographing condition detecting section, to the static image data successively recorded on the recording medium, and the dynamic image outputting section reads-out, from the recording medium, the static image data group corresponding to the dynamic image which is the object of output, and thereafter, switches processing contents of the image processing for a dynamic image in accordance with the photographing conditions expressed by the photographing condition information added to each of the static image data of the static image data group which is read-out.

15. An image photographing and recording method comprising:

automatically setting a frame rate at a time of photographing based on a resolution at a time of a photographing set by a resolution setting section, wherein the higher the resolution is set by the resolution setting section, the lower the frame rate is set;

repeatedly photo graphing a scene which is an object of photographing by a photographing section at the set frame rate as a static image of the resolution set by the resolution setting section;

successively recording static image data, which is successively outputted by photographing by the photographing section, on a recording medium with the static image data in a non-compressed state or a state of being compressed by a compression method which does not utilize correlation between frames and adding a frame rate information, which expresses the frame rate at the time of the photographing by the photographing section, to the static image data which is successively recorded on the recording medium;

when a static image as an object of output is designated via a designating section for designating a static image or a dynamic image as an object of output, reading-out from the recording medium and outputting static image data corresponding to the static image which is the object of output; and when a dynamic image as an object of output is designated via the designating section, reading-out, from the recording medium, a static image data group corresponding to the dynamic image which is the object of output and, thereafter, if the frame rate expressed by the frame rate information added to the static image data group which is read-out is lower than a predetermined frame rate, obtains an interpolation processing to generate static image data corresponding to a lacking frame from the static image data of frames before and after the lacking frame in the order of the photographing dates and times, and outputting the data as dynamic image data.

* * * * *